United States Patent
Schneider et al.

(10) Patent No.: US 7,761,338 B1
(45) Date of Patent: Jul. 20, 2010

(54) AUTOMATION GOODS AND SERVICES TRANSACTION SYSTEMS AND METHODS

(75) Inventors: Hans-Joachim Schneider, Freystadt (DE); Andreas Schönleben, Wolframs-Eschenbach (DE)

(73) Assignee: Siemens Aktiengesellschaft, Munich (DE)

( * ) Notice: Subject to any disclaimer, the term of this patent is extended or adjusted under 35 U.S.C. 154(b) by 1210 days.

(21) Appl. No.: 10/411,675

(22) Filed: Apr. 11, 2003

(51) Int. Cl.
*G06Q 30/00* (2006.01)

(52) U.S. Cl. ........................................ 705/26
(58) Field of Classification Search .................. 705/26, 705/27
See application file for complete search history.

(56) References Cited

U.S. PATENT DOCUMENTS

| | | | |
|---|---|---|---|
| 5,999,914 A * | 12/1999 | Blinn et al. ................... | 705/26 |
| 6,536,935 B2 * | 3/2003 | Parunak et al. ................ | 700/99 |
| 6,597,776 B1 * | 7/2003 | Walker et al. .......... | 379/114.26 |
| 2002/0091632 A1 * | 7/2002 | Turock et al. ................. | 705/39 |
| 2002/0120508 A1 * | 8/2002 | Matsumoto et al. ........... | 705/14 |
| 2003/0055757 A1 * | 3/2003 | Pfiffner et al. ................ | 705/35 |
| 2003/0163413 A1 * | 8/2003 | Wiczkowski ................. | 705/38 |
| 2003/0197060 A1 * | 10/2003 | Coyner ....................... | 235/381 |
| 2003/0204443 A1 * | 10/2003 | Knox .......................... | 705/14 |
| 2005/0256841 A1 * | 11/2005 | Rawat et al. .................. | 707/1 |

OTHER PUBLICATIONS http://www.ad.siemens.de/simatic-cs, pp. 1-2.
http://www.ad.siemens.de/news/html_76/simrepo/1_97/html_76/rub5_1.htm.

* cited by examiner

*Primary Examiner*—Mila Airapetian
(74) *Attorney, Agent, or Firm*—Scott T. Weingaertner; Eric L. Sophir; King & Spalding LLP

(57) ABSTRACT

An enterprise transaction system comprises a communication network accessible using an automation goods and services charge card. The card enables customers to purchase automation-related goods and virtual services from the enterprise. The enterprise comprises business units, each unit providing automation goods and/or services. The customer can access each and every business unit in the enterprise by entering the enterprise transaction system with a personalized goods and services charge card. The card is assigned a unique card number and a personal identification number for each customer. The card is loaded with currency-neutral credits and the transaction system can internally support a wide selection of denominations applicable to internationally recognized countries. The system is capable of settling accounts automatically via the network by decrementing credits on the customer's card corresponding to a purchase and reconciling the same with the customer's bank account. The purchases can be material goods as well as virtual services, including automation related hardware or downloadable software.

51 Claims, 23 Drawing Sheets

300 180 170 160 155 151

[Product & Solutions] • News Center • e-commerce • Support    Home | Sitemap | Print | Deutsch | Personalize Search

Automation and Drives    Take off. And leave the others behind.

Automation and Drives ~330
→ The A&D-Group
→ Associated Companies
→ Countries
→ Jobs & Careers

[→ Industries]   [→ Services]

Automation Systems

→ Industrial Automation Systems SIMATIC
→ Motion Control System SIMOTION
→ CNC Family SINUMERIK
→ Process Control Systems
→ Industrial Communication SIMATIC NET
→ Operator Control and Monitoring Systems SIMATIC HMI
→ PC-based Automation
→ Industrial-PC
→ Industrial-Microcomputer SICOMP
→ SIMATIC based technology
→ System Cables/Cubicles
→ RF-Identification Systems MOBY
→ Display Solutions
→ Navigation Systems for autonomous Service Roboter SINAS
→ Automation Solution Provider

Process Automation

→ SIMATIC PCS 7 Process Control System
→ TELEPERM M Process Control System
→ Field and Panel Instrumentation
→ Process Analytics
→ Weighing Systems SIWAREX
→ Software
→ SIMATIC IT

Communication/ Networks/ Internet Pads

→ Industrial Communication SIMATIC NET
→ Internet Pads MOBIC
→ Standardised Connection Technique with ECOFAST

Sensors and Measuring Systems

→ Measuring Systems SIMODRIVE sensor
→ RF Identification Systems MOBY
→ Proximity Switches BERO
→ Intelligent Sensor System IQ-Sense
→ Machine Vision SIMATIC

Drives

→ AC Motors
→ DC-Motors
→ Distributed Drive Solutions
→ AC Converters
→ DC Converters
→ Engineering-Software
→ Complementary Components
→ SINUMERIK Solution Provider

Low-Voltage Controls & Distribution

→ Cubicles Systems SICUBE
→ Inline-Terminals
→ Proximity Switches BERO
→ Protection Devices
→ Push Buttons and Indicator Lights SIGNUM
→ Relay Family SIMIREL
→ Solutions for Power Distributions
→ Switchgear
→ Switch Gears, Cubicles
→ Fuse systems
→ Transformers SIDACT

Electrical Installation

→ Distribution Boards ALPHA
→ Built-in Devices BETA
→ Building Management Systems GAMMA
→ Switches and Sockets DELTA

Power Supplies

→ Power Supplies SITOP
→ Power Supplies SIDAC S
→ Power Supplies for AS-Interface
→ Transformers SIDAC T
→ Reactors and Filters SIDAC D/F
→ Photovoltaic Inverter
→ Cast Resin Transformers

Industrial IT

→ SIMATIC IT
→ IT Infrastructure & IT Hardware
→ Standard Software

Link Box

→ Totally Integrated Auto
→ Component based Aut
→ Totally Integrated Pow
→ Standardised Connect Technique with ECOF
→ Safety Integrated
→ e-business totally
www.siemens.com/sin Automation&Drives

Enter!

FIG. 8A

AUTOMATION GOODS AND SERVICES TRANSACTION SYSTEMS AND METHODS

FIELD OF THE INVENTION

The present invention relates generally to automation related transactions and the purchase of virtual goods and services using an automation goods and services charge card.

BACKGROUND

A sale by a goods or services provider to a buyer using a charge card typically involves receiving an order, generating an invoice, requiring payment, effectuating fulfillment of the order, and settling any associated accounts. This multi-step process tends to become more complicated if the goods and services provider is from a business enterprise comprising several business units, each providing particular goods and services. A customer may have needs for product or service offerings of more than one of the business units, each with its own practices, a cumbersome proposition for the customer as well as the provider. Even assuming ordering were centralized, the particulars of managing and delivering on an order, and of managing and settlement of accounts for such order, are not generally uniform. In the automation industry, no such centralized ordering using a charge card is possible over a network, either by telephone or computer, despite significant, but previously unmet, demand for a system that can handle automation goods and services orders on behalf of a plurality of business units of an enterprise that sells them. For example, it is not possible to transact business with the well-known Siemens Automation & Drives SIMATIC card across different business units of a worldwide enterprise. Furthermore, the SIMATIC card does not provide access to a customer's account over the internet, nor does it provide management of one's own account by way of presenting an account statement, nor capability to transfer funds within the account. There is also an existing, but unmet, demand to do so through a common interface, using a common card, and operating across a variety of currencies so that global or geographically remote automation customers can order in a simple fashion, and so that settlement not only of customer accounts, but of business unit accounts, is also facilitated.

SUMMARY OF THE INVENTION

The present invention is directed to business transaction systems and methods that support ordering of automation goods and virtual services on demand through the use of personalized account data (PAD) provided on a physical automation goods and services charge (AG&SC) card held by an account holder. The account holder inserts the physical AG&SC card into an appropriate receptacle designed to transact business. The account holder can also transact business by manually entering the PAD information stored on the card into a device that is capable of accepting and transmitting the data to complete the transaction. The system and the card (denoting both the physical and informational aspects) enables purchasing of automation-related goods and services from a business enterprise having a plurality of business units that may be geographically separated, and permits customers to do so irrespective of the currency of the country from which an order is placed. A variety of other advantages associated with particular aspects of the systems and methods are also described.

In an embodiment of one aspect of the present invention, a method is provided for an automation goods and services provider having a plurality of business units to process purchase requests or orders placed by an automation goods and services charge card account holder, the requests relating to an offering of at least one of any of the plurality of business units. The method comprises the following steps. An enterprise host server transmits a signal representing the availability of an offering of at least one of the plurality of business units, the offering selected from the group consisting of automation goods and automation virtual services, the offering to be provided by at least one business unit. The server receives card information from and subsequently elicits order information from the account holder based on the transmitted availability signal. Then the account is checked to determine whether value in the account is sufficient to cover the order. If so, the server transmits a signal directing fulfillment of the order. Accordingly, the server then decrements the account by the value of the order.

In an embodiment of another aspect of the present invention, a method is provided for an automation goods and services provider having a plurality of business units to process purchase requests of a holder of an account with the automation goods and service provider. The requests or orders relate to the offerings of at least one of any of the plurality of business units. The method comprises the following steps. An enterprise host server transmits a signal representing the availability of at least one offering of the plurality of business units, the offering selected from the group consisting of automation goods and automation virtual services, the offering to be provided by the at least one business unit. The server receives account information from and subsequently elicits order information from the account holder based on the transmitted availability signal. Then the account is checked to determine whether value in the account is sufficient to cover the order. If so, the server transmits a signal directing fulfillment of the order. Accordingly, the server then decrements the account by the value of the order.

In another embodiment of the present invention, a method is provided for transmitting value between two card accounts in a system for administering an automation goods and services charge card account. First, a signal is transmitted to associate value with a first card account. Then another signal is transmitted to associate value with a second card account. The system further elicits an account holder instruction to subtract value from the first account and add it to the second account, thereby transferring value between the two accounts.

An embodiment of another aspect of the present invention involves a method for reloading credits to an automation goods and services charge card. The enterprise host server checks the number of credits available in an account associated with a first card. If the number of credits in the first card account is below a pre-selected value that is based on the price of an offering selected from the group consisting of automation goods and automation services (including virtual services), value is transferred from the first account to the second account.

In an embodiment of still another aspect of the present invention, a method in a system for administering automation goods and services charge card accounts allocates account value. The value of a balance of a first automation goods and services charge account held by an account holder is determined, the account available for being drawn upon at the request of the account holder as consideration for the purchase of an offering of at least one of the plurality of business units of an automation goods and service provider. At least one automation goods and service charge account held by the account holder is identified, and a subset of the value of the balance of the first account is distributed among a subset of the further accounts.

In an embodiment of yet another aspect of the present invention, a system for administering an automation goods and services charge card account is provided. The system permits a card-holding customer of an automation goods and services enterprise to purchase goods and services from any of a plurality of business units of the enterprise. The system comprises: an automation goods and services charge card computer in communication with the customer and, over a network, with a plurality of business units of the enterprise. The automation goods and services charge card computer is configured to transmit automation goods and services information to the customer and to receive order information from the customer regarding a purchase from at least one of the plurality of business units. The automation goods and services computer is further configured to maintain the customer's account and to maintain accounts corresponding each of the plurality of business units and the automation goods and services charge card computer is further configured to debit the customer's account to reflect account holder order information and to settle the account of any of the plurality of business units affected by the account holder order.

In an embodiment of another aspect of the present invention, an enterprise system architecture is provided for administering the use of an automation goods and services charge card provided by an automation goods and service provider having a plurality of business units. Automation goods and automation services, including virtual services, are offered to the cardholder by at least one of the plurality of business units. The system architecture comprises means for the card holder to access information relating to offerings of any one of the plurality of business units, means for managing the card holder's account, the account serviced by at least one of the plurality of business units, and means for transmitting an order for purchasing automation goods and services offered by any one of the business units.

In an embodiment of yet another aspect of the present invention, an enterprise system administers business transactions conducted between an automation goods and services provider having a plurality of business units and a holder of an automation goods and services charge card provided by at least one of a plurality of the business units. The enterprise system comprises means for the card holder to register with the at least one of the plurality of business units. Registration may be, but is not limited to, opening an account by purchasing a card, accessing the enterprise system remotely or by other suitable means. The system further comprises means for the card holder to open an account with the at least one of the plurality of business units with which the card holder has registered and means for the card holder to select automation goods or services offering provided by the plurality of business units. The system also comprises means for settling accounts associated with the plurality of business units to reflect the selection of the automated goods or services and means for the plurality of the business units to store updated automation goods and service charge card data following the account settlement.

In an embodiment of another aspect of the present invention, an enterprise system is provided for administering business transactions conducted between an automation goods and services enterprise and a holder of an automation goods and services charge card provided by the enterprise. The enterprise system comprises means for the card holder to register with the enterprise, means for the card holder to open an account with the enterprise, means for querying and selecting offerings of automation goods and services provided by the enterprise, means for settling accounts associated with the enterprise, and means for the enterprise to store automation goods and services charge card data.

An embodiment of yet another aspect of the present invention involves a system for providing automation-related offerings of an automation goods and services enterprise system having a plurality of business units, the offerings comprising at least one selected from the group consisting of automation goods and automation virtual services. The system includes an automation goods and services charge card server in communication with a plurality of business units and for supporting transactions between the businesses units of a holder of such card, a dispatching system in communication with the automation goods and services card server of at least one of the plurality of business units and an online enterprise server in communication with the automation goods and services charge card server of the at least one of the plurality of business units, for supporting transactions with customers interacting with the automation goods and services charge card server as a card holder.

An embodiment of yet another aspect of the present invention provides a method for an automation goods and services provider, having a plurality of business units, to transmit to a customer signals relating to the automation goods and services available from the plurality of business units and to process a purchase order from the customer. The method includes the following steps. A signal is transmitted, e.g., by an enterprise server of the automation goods and services provider, to the customer, representing availability of at least one offering selected from the group consisting of automation goods and automation virtual services, the offering to be provided by at least one of the plurality of business units. Order information is elicited from the customer based on the transmitted availability signal and a check is made to confirm whether the customer is an account holder with the at least one business unit. Alternatively, this check could be made prior to transmitting availability information to the customer. Regardless, if the customer is an account holder, a check is made to determine whether value in the customer's account is sufficient to cover the purchase order. If so, a signal is transmitted (e.g., without limitation, to a dispatching system or other suitable means) directing the fulfillment of the order for the customer. Finally the customer's account is settled to reflect the order.

In an embodiment of yet another aspect of the present invention, a system provides automation-related offerings of an automation goods and services provider having a plurality of business units. The system comprises an automation goods and services card computer in communication with computers associated with a plurality of business units of the provider. The automation goods and services card computer is configured to transmit online shop content of the card holder, the online shop providing the card holder with access to information relating to offerings of the plurality of business units. The automation goods and services card computer is further configured to transmit content related to support services for the card holder.

In a further embodiment, an enterprise system architecture for enabling and administering use of an automation goods and services charge card is provided. The system architecture, supported by an automation goods and services charge card computer, comprises a registration database, a permanent archival database, an account number database, an archival database, a customer profile database a customer account settlement database, and an information release database.

In still another embodiment, a system provides a capability for purchasing automation-related offerings with or without an AG&SC card. A non-account holder can shop online via an online server, which in turn communicates with an AG&SC card server that communicates with the former server according to a file transfer protocol, for example. The online server accommodates a port and maintains a script file. AG&SC card server includes an information management databank, an SQL database, and a script file. A dispatching system communicates with the AG&SC card server such that the online shopper can be served through the AG&SC card server. Furthermore, a holder of an AG&SC card can automatically purchase goods and services offerings either online or through any other device, such as a telephone or fax, that can communicate with the AG&SC card server.

BRIEF DESCRIPTION OF DRAWINGS

FIG. 4B shows an embodiment of a user interface screen supporting a login procedure for the AG&SC card web site, according to the present invention.

FIG. 8A shows an embodiment of a user interface screen supporting various products and solutions that can be purchased using the AG&SC card, in accordance with the present invention.

DETAILED DESCRIPTION

Figure 1:
FIG. 1 is a schematic representation of global communication networks between an automation goods and services enterprise and its various geographically distributed business units, and also of customers of that enterprise in communication with one another over one or more global communication networks.

FIG. 1 shows an automation business enterprise (E) center 10 interconnected with its business units (B) 20 across the globe through a global communication network 30, according to the present invention. Communication network 30 may comprise the Internet and/or a variety of other networks, such as local area networks (LAN), wide area networks (WAN), public switched telephone network (PSTN), and the like. The networks are accessible by customers C (40), who are also, in general, geographically distributed around the world, in various countries having their own currencies. The business enterprise provides automation goods and services purveyed by the various business units of the enterprise to its customers, according to the present invention, through a centralized mechanism, involving a charge account having an associated number or other identifier, and optionally associated with a charge card. Aspects of these transactions can be conducted using any modality afforded by the global communication network 30, including but not limited to packet-switch data transfer, voice transmission, voice-over IP, or other means. A goods and services charge card provided by the automation business enterprise to its customers, as described in detail below, facilitates the automation goods and services transactions.

Figure 2:
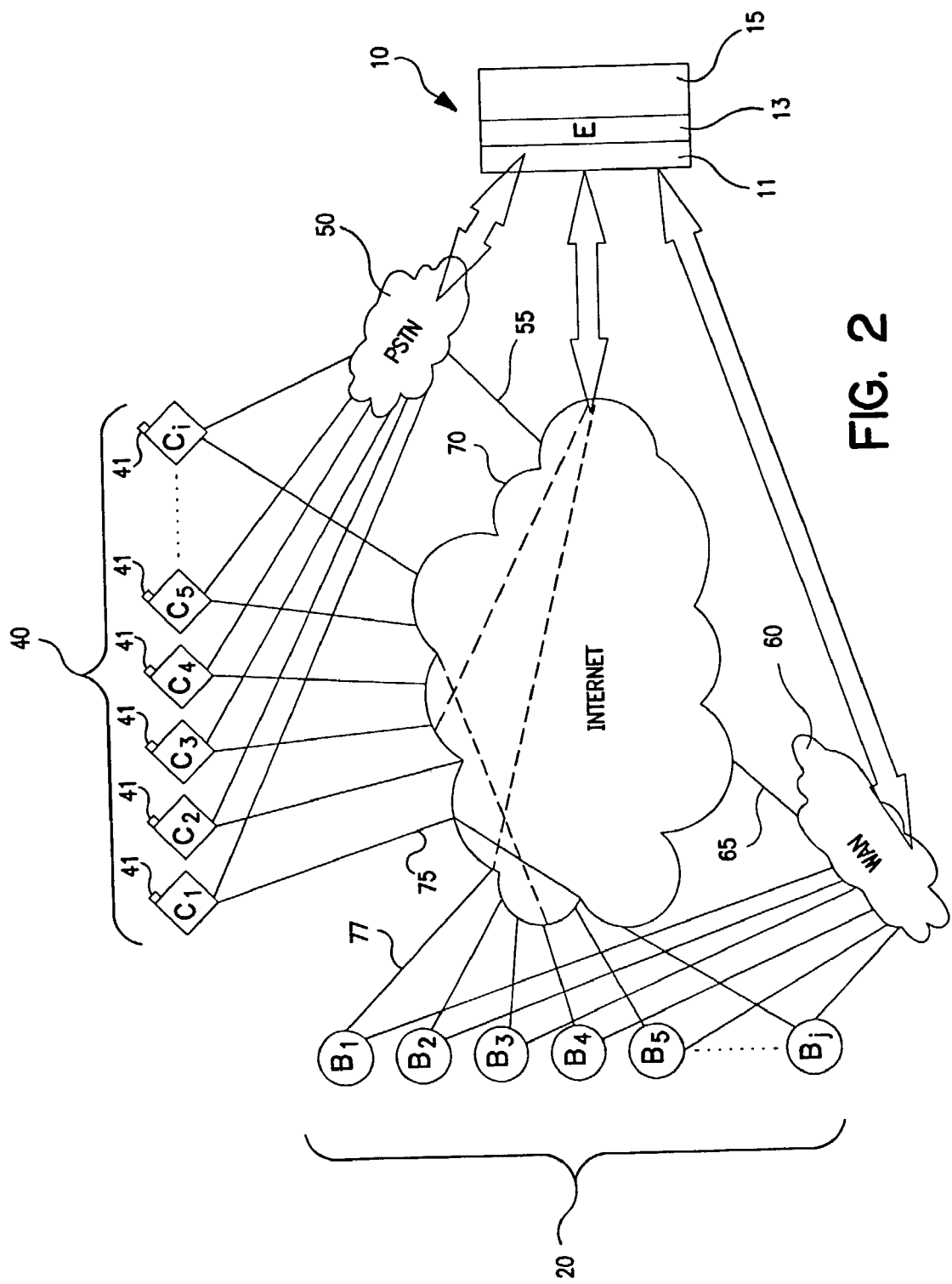
FIG. 2 is a diagram showing an embodiment of an aspect the present invention, according to which an automation goods and services enterprise host server communicates, via global communication networks, including the Internet, with a plurality of business units and a plurality of customers.

FIG. 2 shows an embodiment of an aspect of the invention showing a global network in which automation goods and services transactions may take place between any one of customers $C_{1, \ldots, i}$ 40 and an enterprise service center E 10 representing the enterprise system and various business units $B_{1, \ldots, j}$ 20 associated with the enterprise system. A host server 15, residing at enterprise system E 10, provides an interface between customers C 40 and their choice of business units 20 on a real time basis and in a manner that is transparent to the customer. In an embodiment of the present invention, host server 15 holds a frequently updated database of the offerings of all the business units $B_{1, \ldots, j}$ 20. It is also possible that the enterprise system only provide links to business unit servers holding their own databases.

The same host server 15 can also interact with the customer and perform the transaction with a business unit B 20 on behalf of the customer C 40, if the customer C 40 so desires, in real time and in a manner transparent to the customer. This can be accomplished with an interface switchboard 11 shown in FIG. 2. The business units B 20 have their own interface systems (not shown). The transactions between the enterprise E 10 and the customer C 40, and between the enterprise E 10 and the business units B 20, are paperless and occur without invoicing. Accounts settlement and reconciliation, according to an aspect of the present invention, are accomplished on line, as further described below.

In one embodiment of the present invention, customer C 40, who has opened an account with the business enterprise E 10 or with one or more of its various business units 20 according to suitable means, can connect to the host server 15 by entering personalized account data that may also be provided on an associated automation goods and services charge AG&SC card 41. The customer can do so by entering such account data into a computer terminal (not shown) in communication with host server 15. A telephone, fax, a laptop, wireless, or other communication devices may also be used to connect to host server 15. FIG. 2 shows direct links 50 and 60 between the enterprise host server 15 and the various communication devices. Internet 70 provides a common communications medium between the customers C and the enterprise host server 15. In an embodiment of the system, customers C interact or transact only through the centrally located enterprise host server 15, though it is possible that they can also connect with the various business units directly. A variety of combinations of these systems 75, 77, and others 55, 65, are possible AG&SC card 41 may be used, in accordance with the principles of the present invention, for the purchase of goods, software, actual or virtual services, or any combination of these. Cards that are only usable to purchase goods, but not services, or vice-versa, may, nevertheless, fall within the scope of the present invention.

As shown in FIGS. 1 and 2, automation goods and services charge (AG&SC) card 41 facilitates worldwide transactions in the purchase of automation goods and services, including virtual services, through various communication networks 50, 60, 70, and others, not shown. Transactional communications initiated by a customer holding AG&SC card 41 in any part of the world are received at host server 15, where, in one embodiment, interface boxes 11 direct the communications to a router 13, which in turn connects to a card server 80 with its own data storage medium, such as a computer disk or tape. The business enterprise E 10 is capable of supporting a plurality of business unit $(B_{1, \ldots, i})$ computers to serve the needs of customers $(C_{1, \ldots, j})$ in several ways.

Figure 3A:
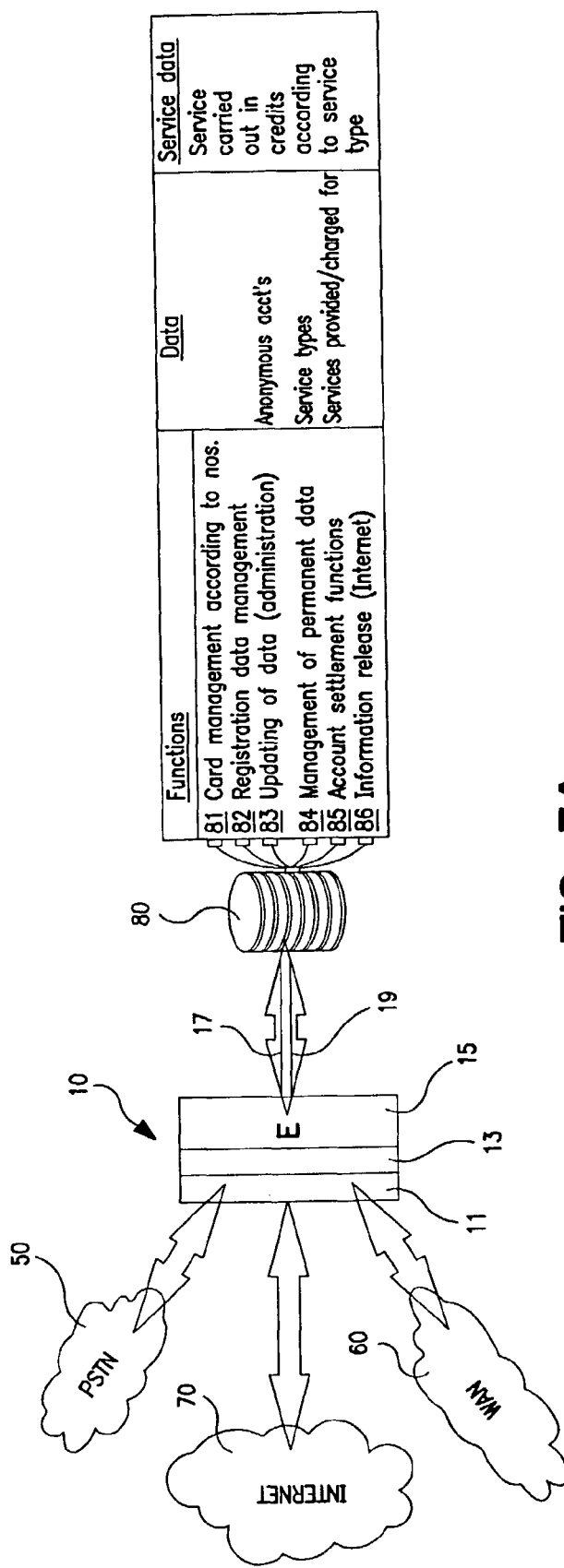
FIG. 3A is a schematic representation of an embodiment of another aspect of the present invention showing the enterprise host server in communication with a card server, according to the present invention.

FIG. 3A, in one embodiment, shows AG&SC card server 80 that manages AG&SC card transactions received from host server 15 over the network (50, 60 or 70). The communications over the network include card holder transactions 17 and service and support functions 19 provided by enterprise system 10 for administering the sale of automation goods and services. According to an aspect of the present invention, any one of the plurality of business units B 20 can also communicate directly with a customer C 40 transmitting requests over the network 50, 60 or 70. The AG&SC card server 80 is configured to transmit automation goods and services information to the card holder, e.g., customer C 40, and to receive order information from the card holder regarding a purchase from at least one of the plurality of business units B 20. Server 80 is further configured to maintain the card holder account and to maintain accounts corresponding to each of the plurality of business units, as shown in FIG. 3B.

Figure 3B:
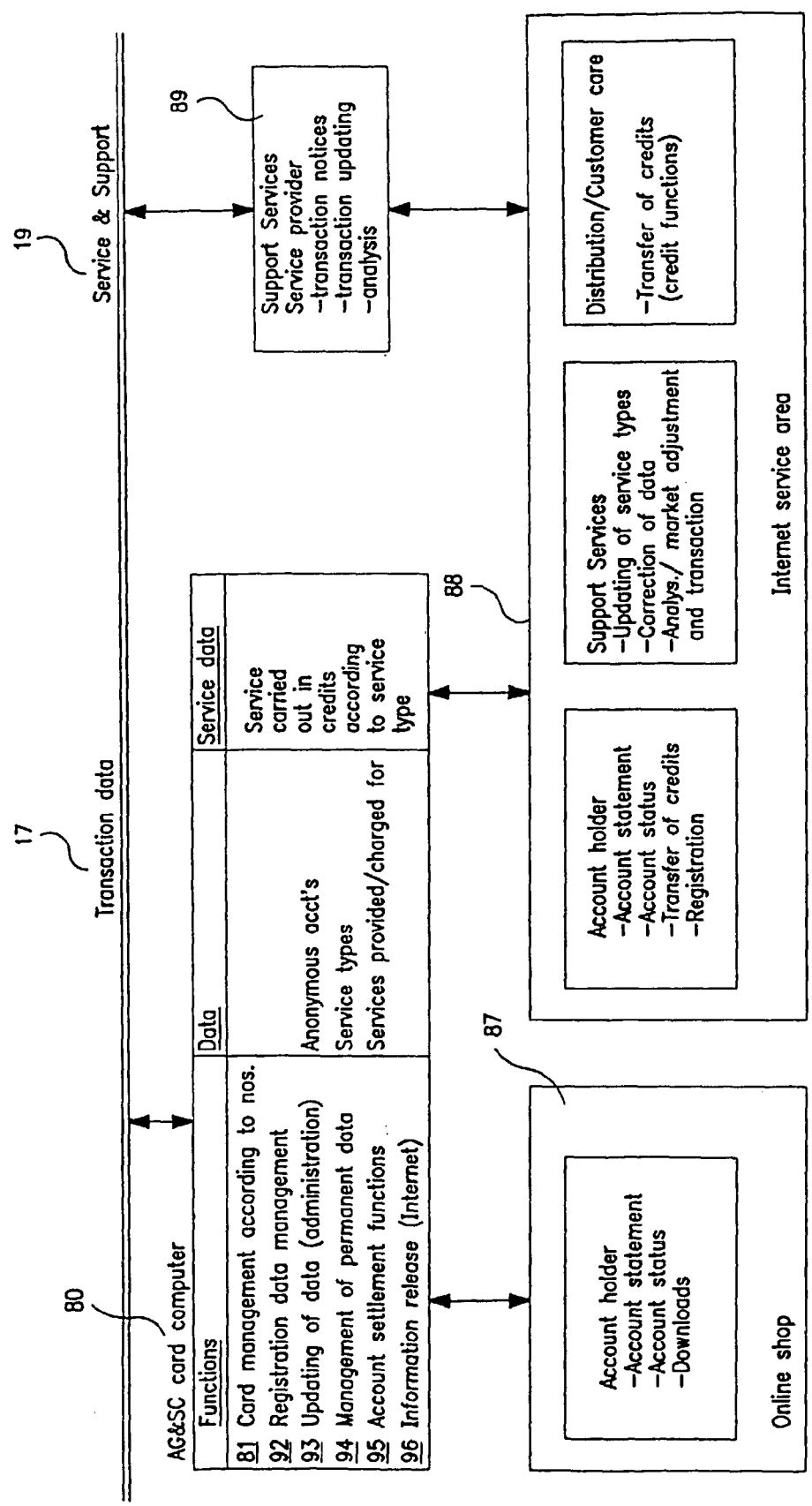
FIG. 3B is a schematic representation showing in greater detail the card server of FIG. 3A in communication with an online shop and support services provided over the Internet, according to the present invention.

The various functions performed by AG&SC card server 80 shown in FIG. 3B include card management according to card numbers 81, registration management 82, updating account data 83, managing permanent archival data 84, settling accounts 85, and information release functions on the Internet 86. Databases associated with each one of these functions can include anonymous accounts, service types and charges for services provided. Service data includes credits for services rendered.

In an embodiment of an aspect of the present invention, the system architecture shown in FIG. 3B provides a capability for purchasing goods and services with or without an AG&SC card 41. A shopper for automation goods and services, e.g., customer C 40, can make purchases over the internet on an online shop 87. Using the services provided by either host server 15 or card server 80 associated with a business unit of the enterprise system, the shopper can register online, and request purchase of automation goods and services, and at the same time, subscribe to the services by requesting an AG&SC card, if so desired. Account statement, account status, and download services are provided both for card holders and non-card holders alike. Querying either the enterprise system or any one of the plurality of business units directly, regarding the purchase of multiple AG&SC cards 41, loading and transferring between and among the cards, market analysis and retrieval of enterprise related news can readily be accomplished through support services 89 over the network, via service and support 19. In one embodiment, internet service area 88, in communication with AG&SC card computer 80, as well as with support services 89, provides: account holder functionality, including account statement, account status, transfer of credits and registration; support services, including updating of service types, correction of data, analysis and market adjustment and transaction; and distribution/customer care, including without limitation the transfer of credits (or other credit functions) as described further below. The functions according to the aspects of the invention shown in FIG. 3B may be arranged and carried out on any suitable hardware and software platform configuration.

The AG&SC card 41 may be an integral component of a comprehensive service approach provided according to the present invention for virtually all of a customer's automation-related needs. Irrespective of whether a customer needs a set of specific services from a technical support unit, or wants to purchase support tools on the online shop, the customer, regardless of the currency he or she might otherwise transact in, can always pay using AG&SC card 41, according to the present invention and as further described below.

A transactional communication is initiated by entering a card number and a PIN into any of the communication devices, using a customer's own respective (e.g., preferred) means for entering numbers. In an embodiment of the present invention, no special card reader need be used with AG&SC card 41. A card number and PIN may be provided on the AG&SC card 41. When the card is issued, it is loaded with a credit line as requested by the customer. The card can be ordered over the Internet and paid for by using an ordinary credit card or other suitable means, and can be used immediately. Several cards can be ordered at the same time. The registration is confirmed via fax, e-mail or other means. Furthermore, the value, e.g., the number of credits purchased and associated with the card account, can be provided on the back of the physical AG&SC card at the time of delivery. A scratch field can overlay this account credit field in order to assure customer privacy.

Figure 4A:
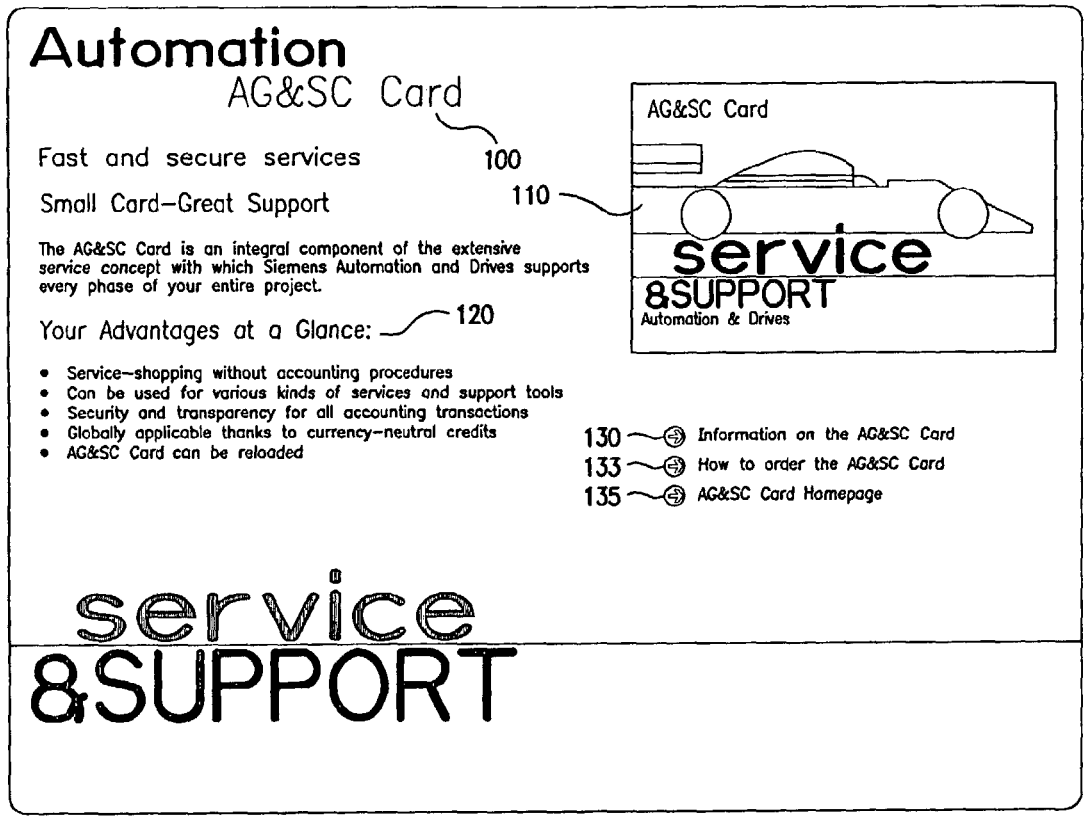
FIGS. 4A and 4B show an embodiment of a user interface screen supporting the various attributes of an automation goods and services charge (AG&SC) card.
Figure 4B:
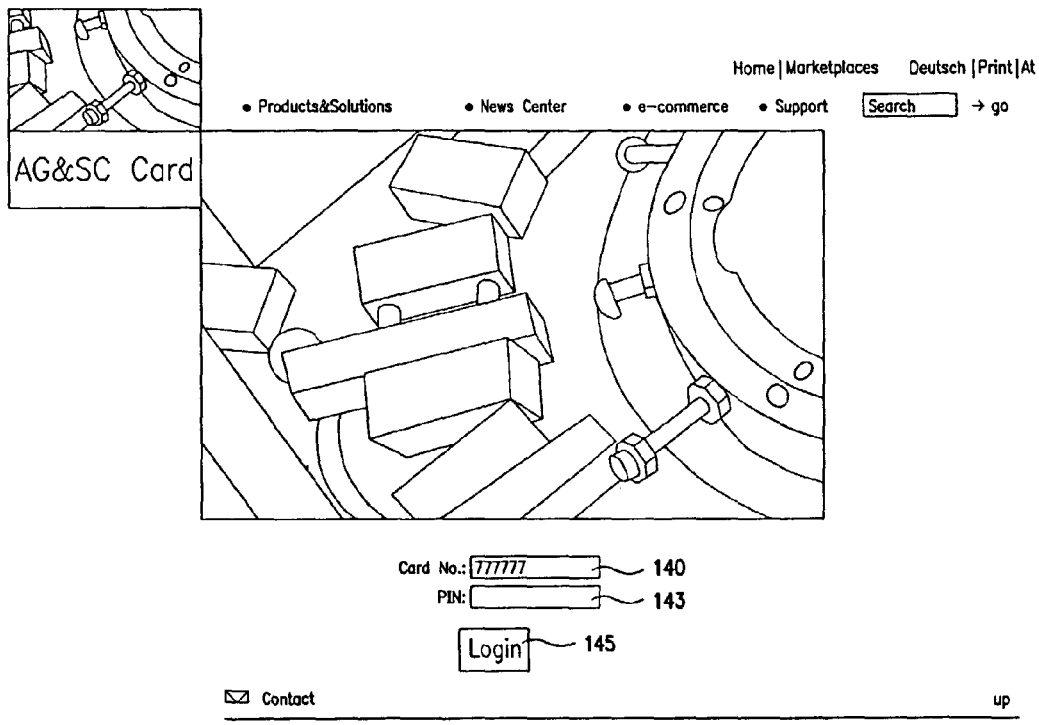

An embodiment of other aspects of the present invention is shown in FIGS. 4A-8B, which show example user faces describing system functionality and modes of user interaction. Information about the AG&SC card can be obtained from the Internet by entering its appropriate address, e.g., uniform resource locator (URL). An embodiment of a screen from the web site is shown in FIG. 4A. The name of the card, AG&SC card 100, is shown at the left top portion of the screen, the card itself depicted on the right at 110. Advantages of the card 120 and information 130 about the card, such as how to order the card 133, are also displayed on the screen. Clicking on 135 with a cursor invokes a Login page as shown in FIG. 4B. Entering card number 140 and PIN 143, and clicking 145 retrieve a page relating to Customer Area 150 shown in FIG. 4C. The customer can then review a statement of account 190, transfer credits between AG&SC cards 200 (further described below), review price summary 210 of available goods and services, go to technical support 220, or to online shop 280, and register 290. The customer can interact with the web site in different languages, print, and search 151. The customer can visit marketplaces or return to home page 155. Other choices that are available include support services 160, electronic commerce 170, and news center 180. The various products and solutions can be found by clicking 300 in the web site shown in FIG. 4C.

Figure 4C:
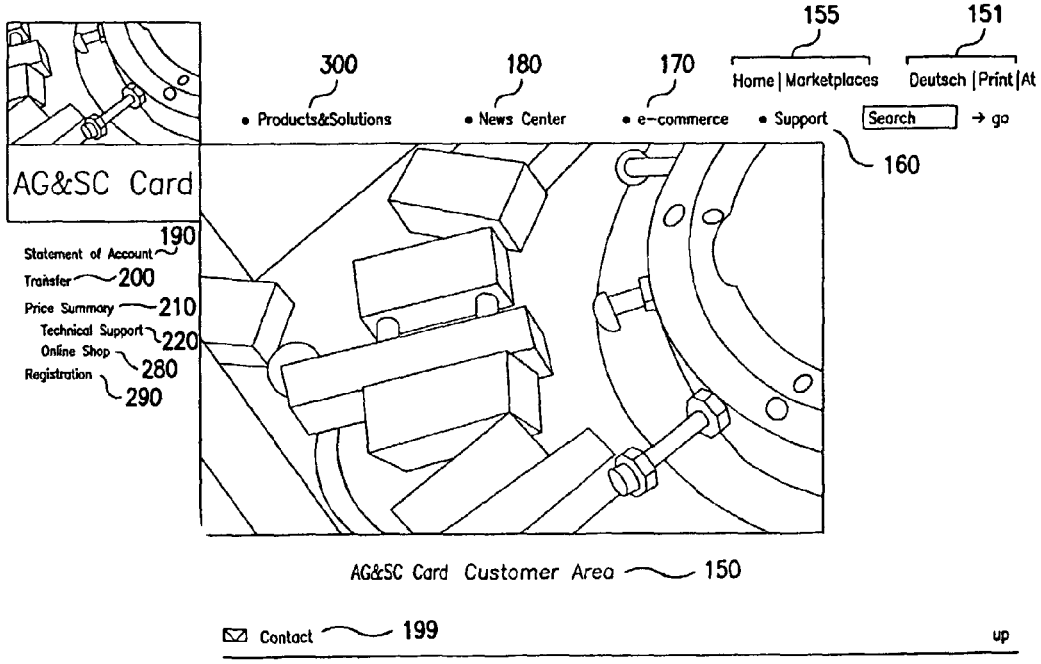
FIG. 4C shows an embodiment of a user interface screen providing AG&SC card customer area, according to an aspect of the present invention.
Figure 4D:
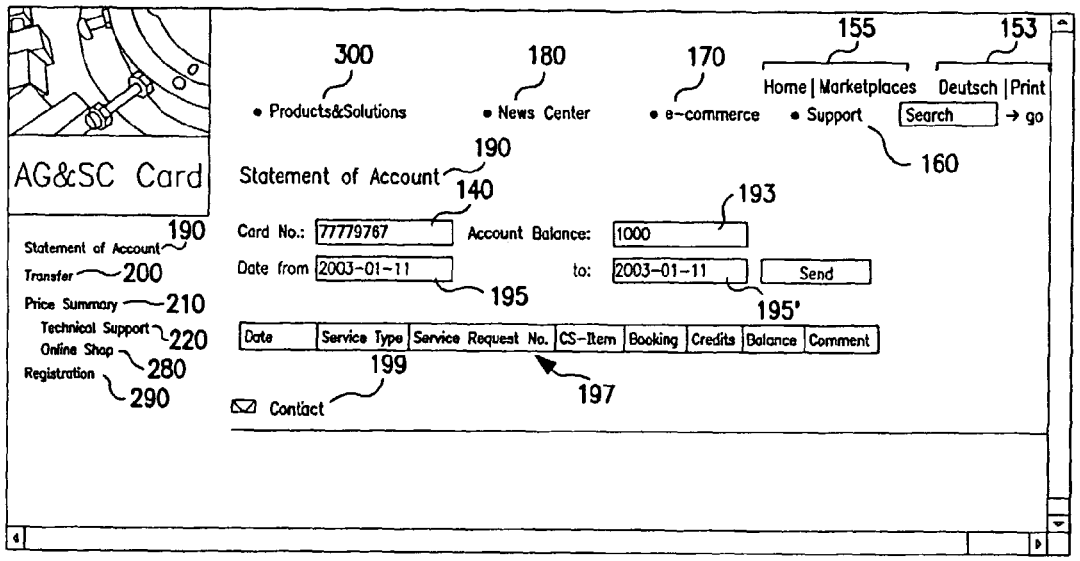
FIG. 4D shows an embodiment of a user interface screen providing a statement of an AG&SC card account, according to an aspect of the present invention.

Clicking on 190 retrieves a page relating to a statement of account web page shown in FIG. 4D. In the example shown in the figure, account balance 193 shows the number of credits available in the account, 1000 credits in this example. The dates for the balance are shown in fields 195 and 195'. A summary of the account is also shown in windows 197, detailing, among other things, the date, service type, service request number, and comments on the account. The customer can contact the entity providing the service, that is, either the enterprise system or one of the business units, by clicking contact icon 199 shown in FIG. 4D.

Figure 4E:
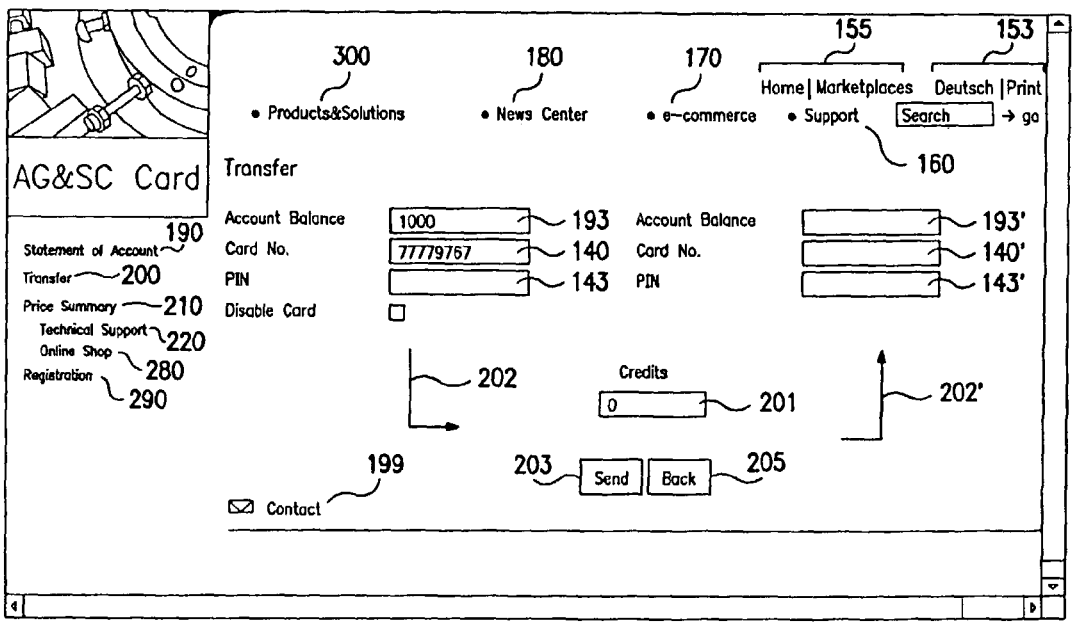
FIG. 4E shows an embodiment of a user interface screen supporting a transaction involving the transfer of credits from one AG&SC card account to another, according to an aspect of the present invention.

Clicking on 200 in FIG. 4C retrieves a page to transfer web page shown in FIG. 4E. On this web page, the customer can transfer credits from one AG&SC card account to another. An account balance for one card is shown in window 193 and for the other card account in window 193'. Each card account has its own respective card number 140, and 140'. If desired, each account can have a separate PIN, 140 and 140'. The credit transfer transaction is accomplished by entering an amount to be transferred in window 201, and sending 203 the information to the server. If it is desired to go back and start over again, button 205 is available for that purpose. The customer is also given a choice to contact the system administrator by clicking contact button 199, which is available in all web pages.

Figure 5A:
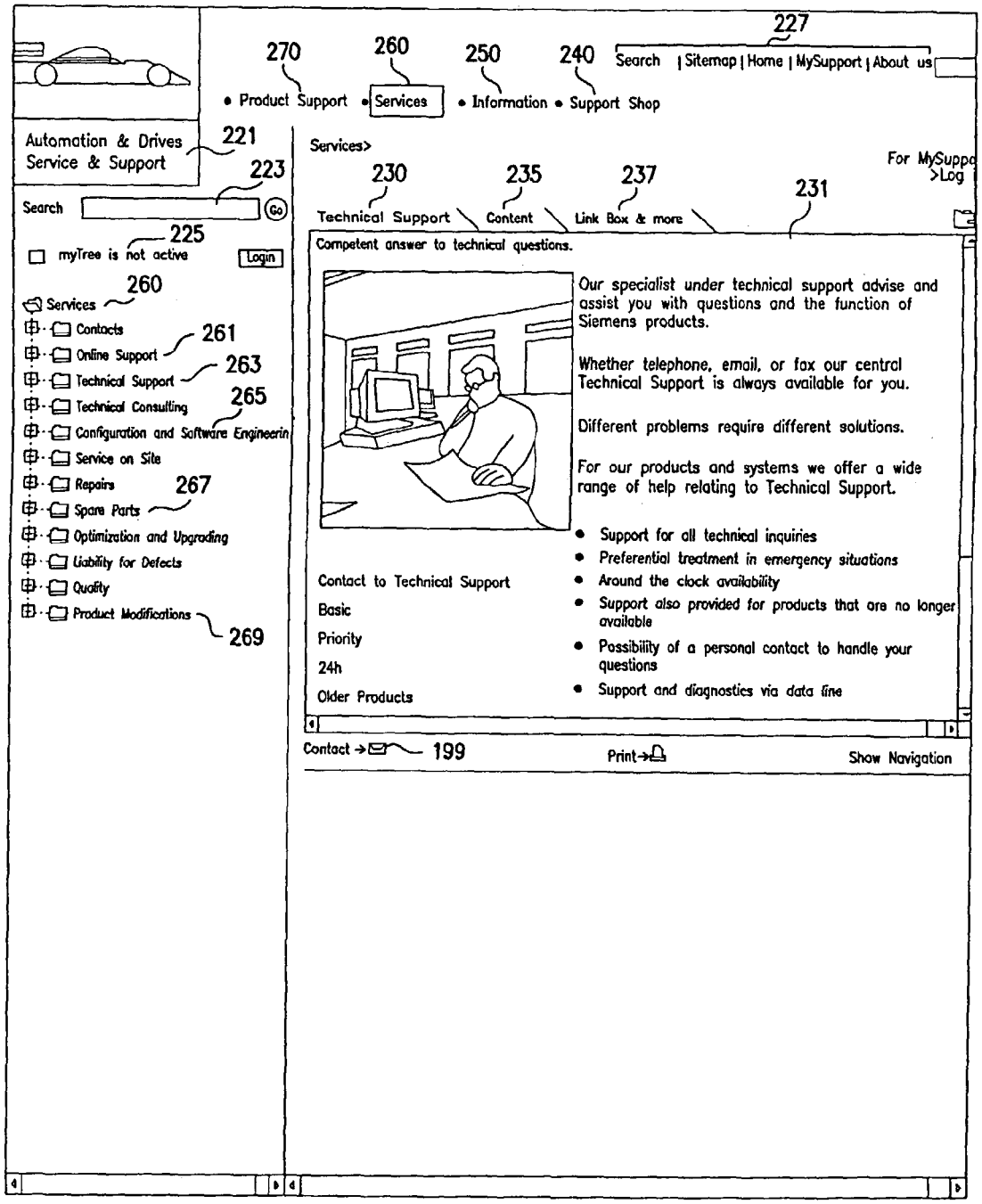
FIG. 5A shows an embodiment of a user interface screen supporting various services provided by a business unit of the automation goods and services provider in relation to purchases that can be made with an AG&SC card, according to an aspect of the present invention.

A customer can view price summary information for various goods and services by clicking 210 or going directly to technical support by clicking 220. FIG. 5A shows services 260 web page. Web pages for support shop 240, information 250 and product support 270 are accessible from the service page shown in FIG. 5A. Other useful links, including search, sitemap and home are provided with icons 227. Specific services are listed on the sidebar with drop-down menus for contacts, online support 261, technical support 263, technical consulting, configuration and software engineering 265, spare parts 267, and quality 269. A tree function 225 provides a field for retrieving an individualized menu for specific needs. Tabs 230, 235 and 237 provide access to technical support, contents of the technical support, and links, respectively, while main body 231 of the services web page informs the customer of the expected answers to technical questions.

Figure 5B:
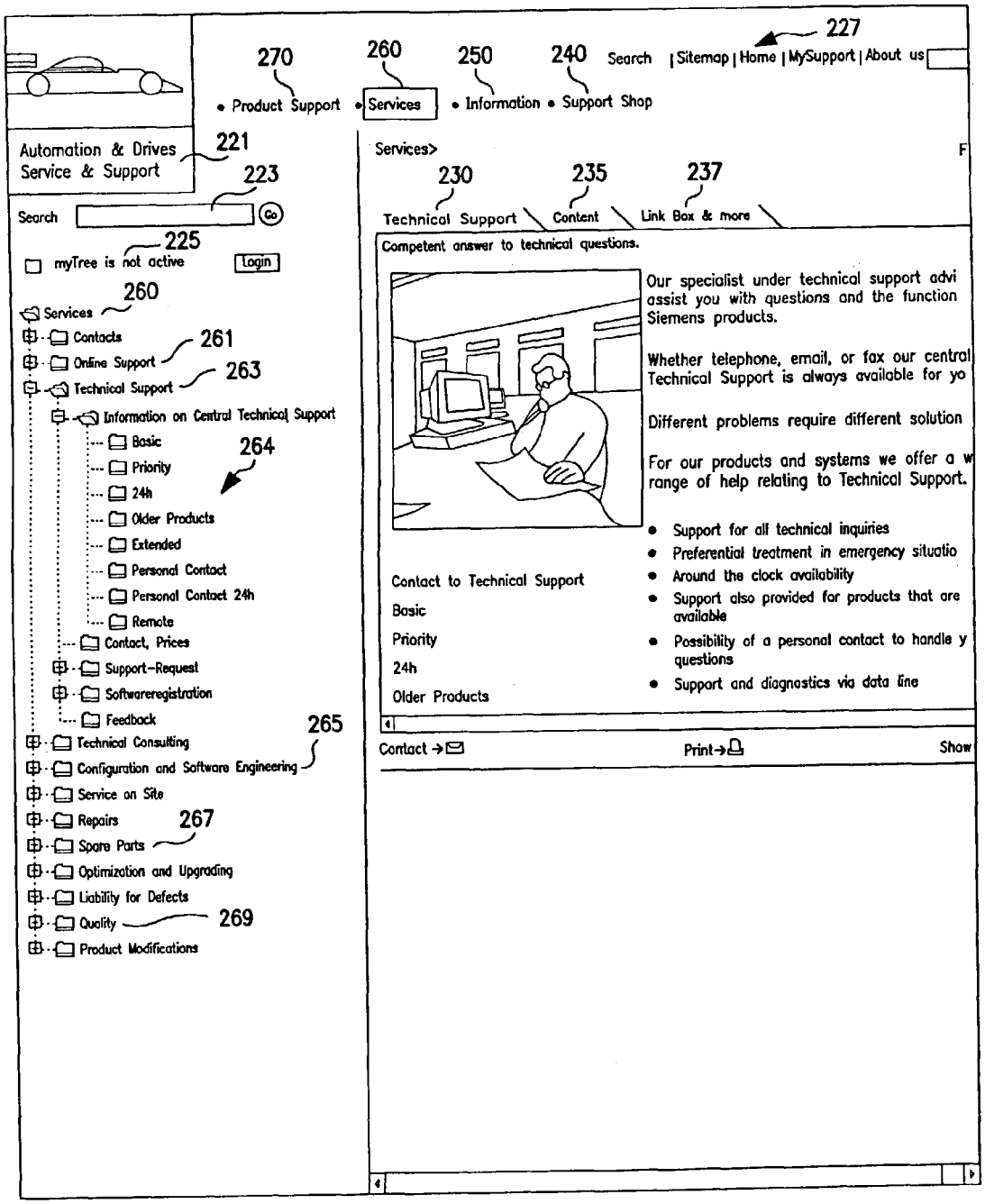
FIG. 5B shows an embodiment of a user interface screen supporting expanded services that can be purchased with an AG&SC card, according to an aspect of the present invention.
Figure 5C:
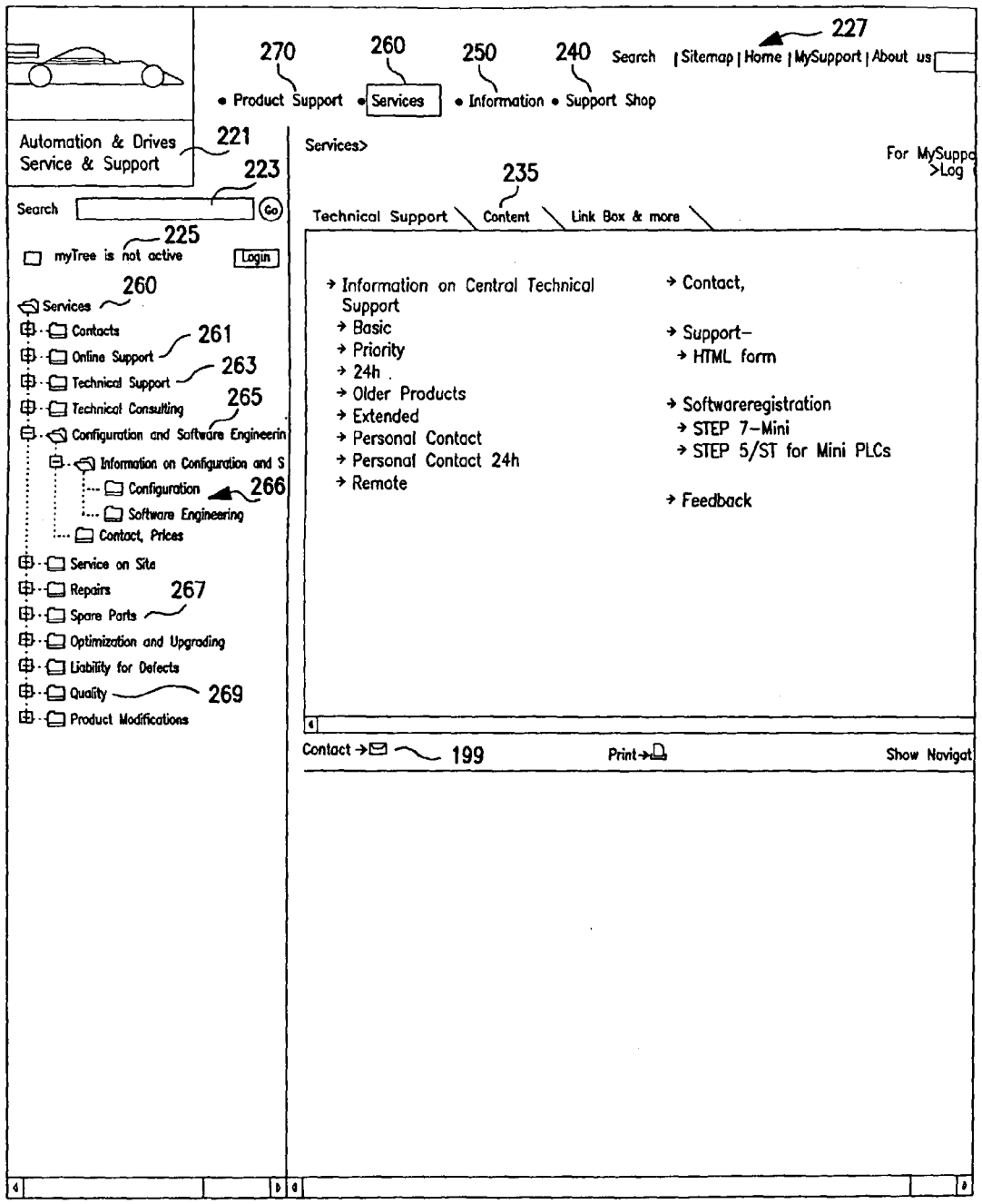
FIG. 5C shows an embodiment of a user interface screen supporting the content of services that are available for purchase with an AG&SC card, according to an aspect of the present invention.
Figure 5D:
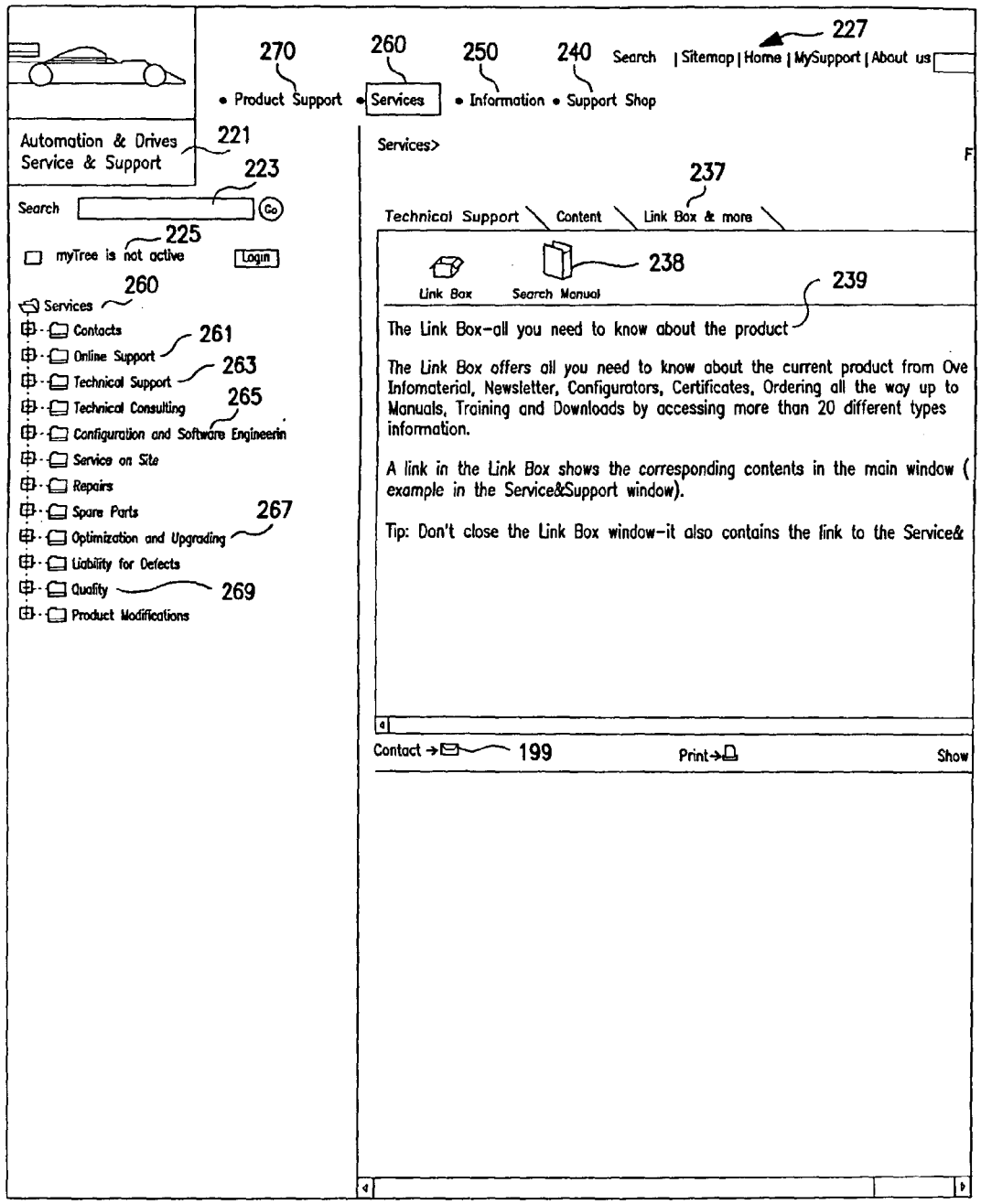
FIG. 5D shows an embodiment of a user interface screen supporting link box for having access to different offerings to purchase with the AG&SC card of the present invention.

As an example, FIG. 5B shows, under drop-down menu 263, the types of technical support that are available. The types of support range from addressing cases in the order of a predetermined priority to providing support that is remotely rendered 264. FIG. 5C shows choices available under configuration and software engineering 265 menu, including configuration, software engineering, contact information and prices 266. The sidebar is always available under each one of the tabs 230, 235 and 237. For example, the drop-down menu for configuration and software engineering 265 is open under contents tab 235. Similarly, link box tab web page 5D shows the same sidebar as before, except that the drop-down menus are closed. Main body 239 describes the kinds of content links accessible by hypertext link from the web page, as well as providing a search manual 238 to assist the customer.

Figure 5E:
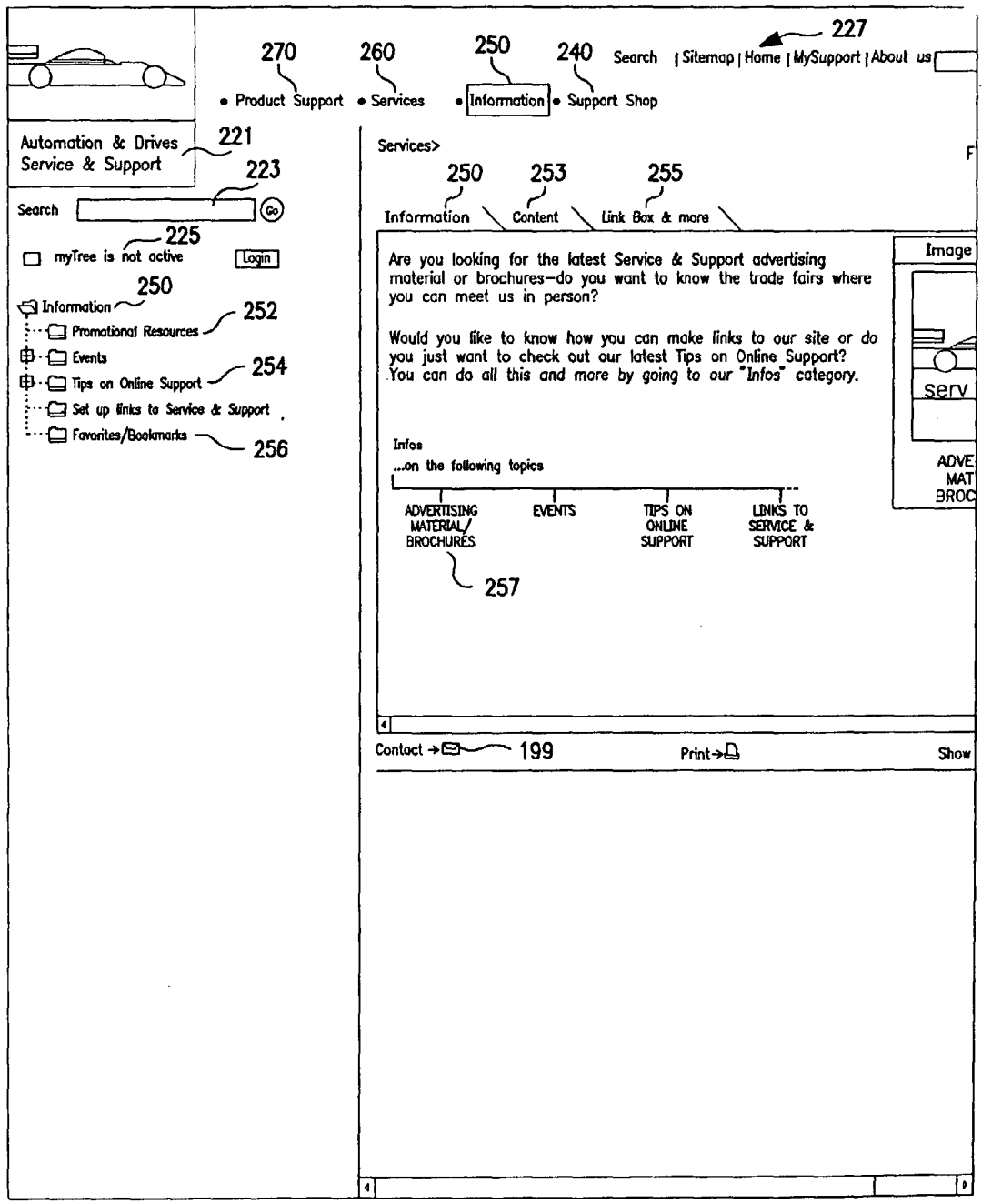
FIG. 5E shows an embodiment of a user interface screen supporting the various information related to the AG&SC card of the present invention.

FIG. 5E shows an information web page that is accessible by clicking information 250 link on the web page shown in FIG. 5B. The information sidebar contains drop-down menus pointing to promotional resources 252, tips on online support 254, and others. In the main body of the web page, various informational materials, including advertising brochures 257, are listed.

Figure 6A:
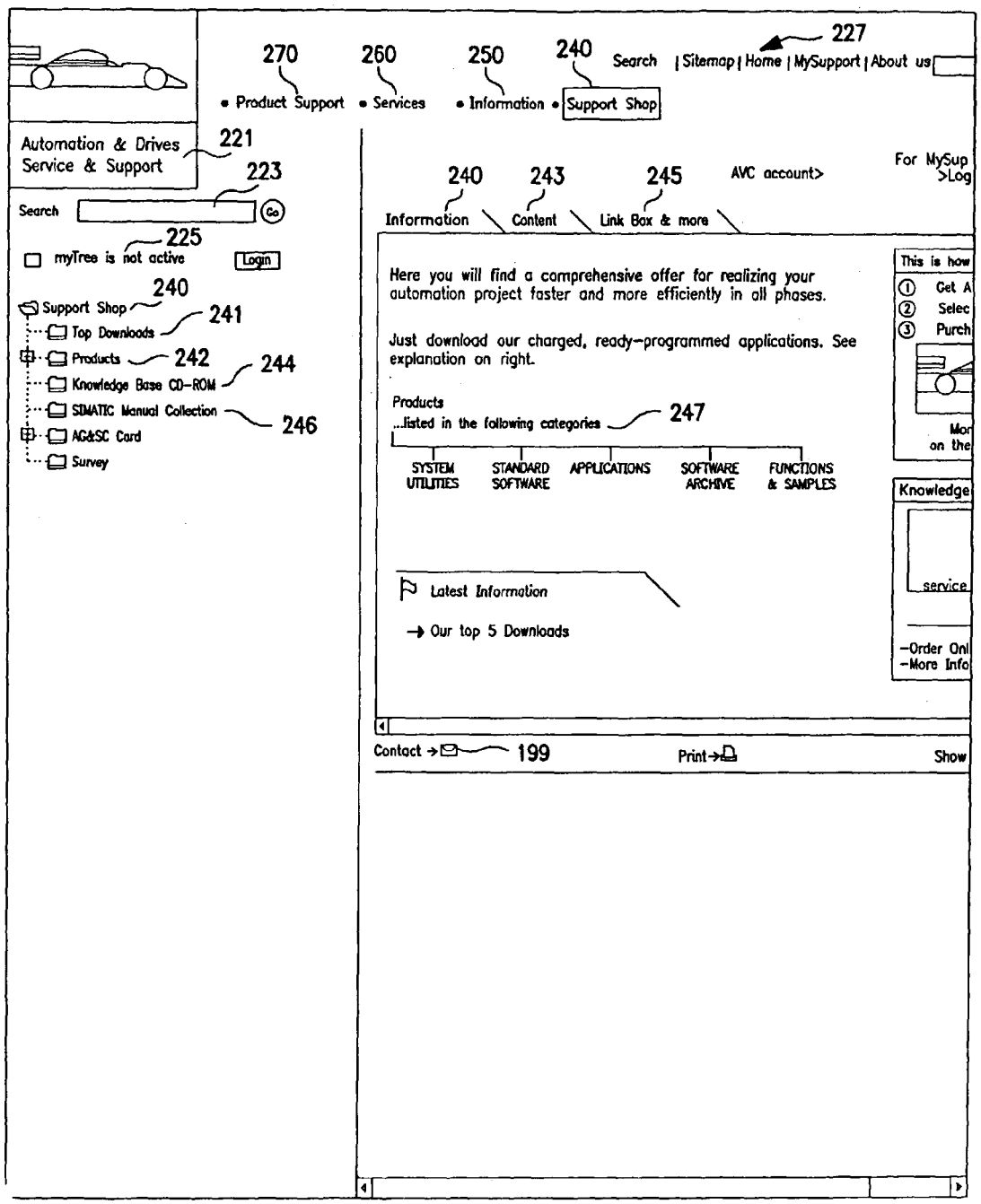
FIG. 6A shows an embodiment of a user interface screen supporting offerings available for purchase from support shop using the AG&SC card, according to an aspect of the present invention.

Clicking support shop 240 link on the web page shown in FIG. 5B, retrieves a page as shown in FIG. 6A. A corresponding sidebar appears on the left side of the web page with drop-down menus, including 241, 242, 244, 246 that point to top downloads, products, knowledge base CD-ROM, automation manual collection, respectively, and an AG&SC card survey. Automation manuals describe, for example, programmable controllers. In support shop 240, manuals and products are listed in their respective categories 247, as shown in FIG. 6A.

Figure 6B:
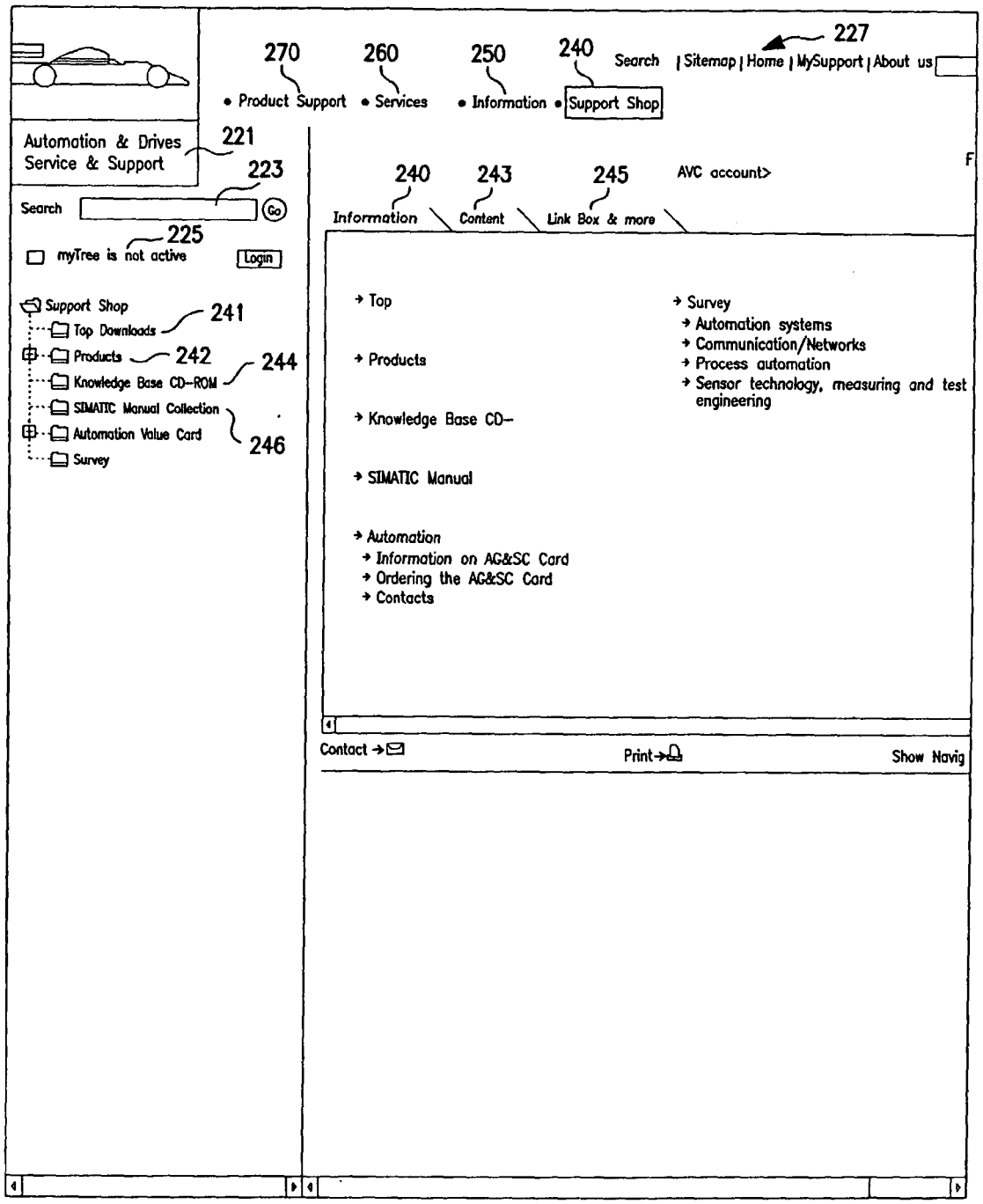
FIG. 6B shows an embodiment of a user interface screen supporting a selection of the content of the support shop services, according to an aspect of the present invention.
Figure 6C:
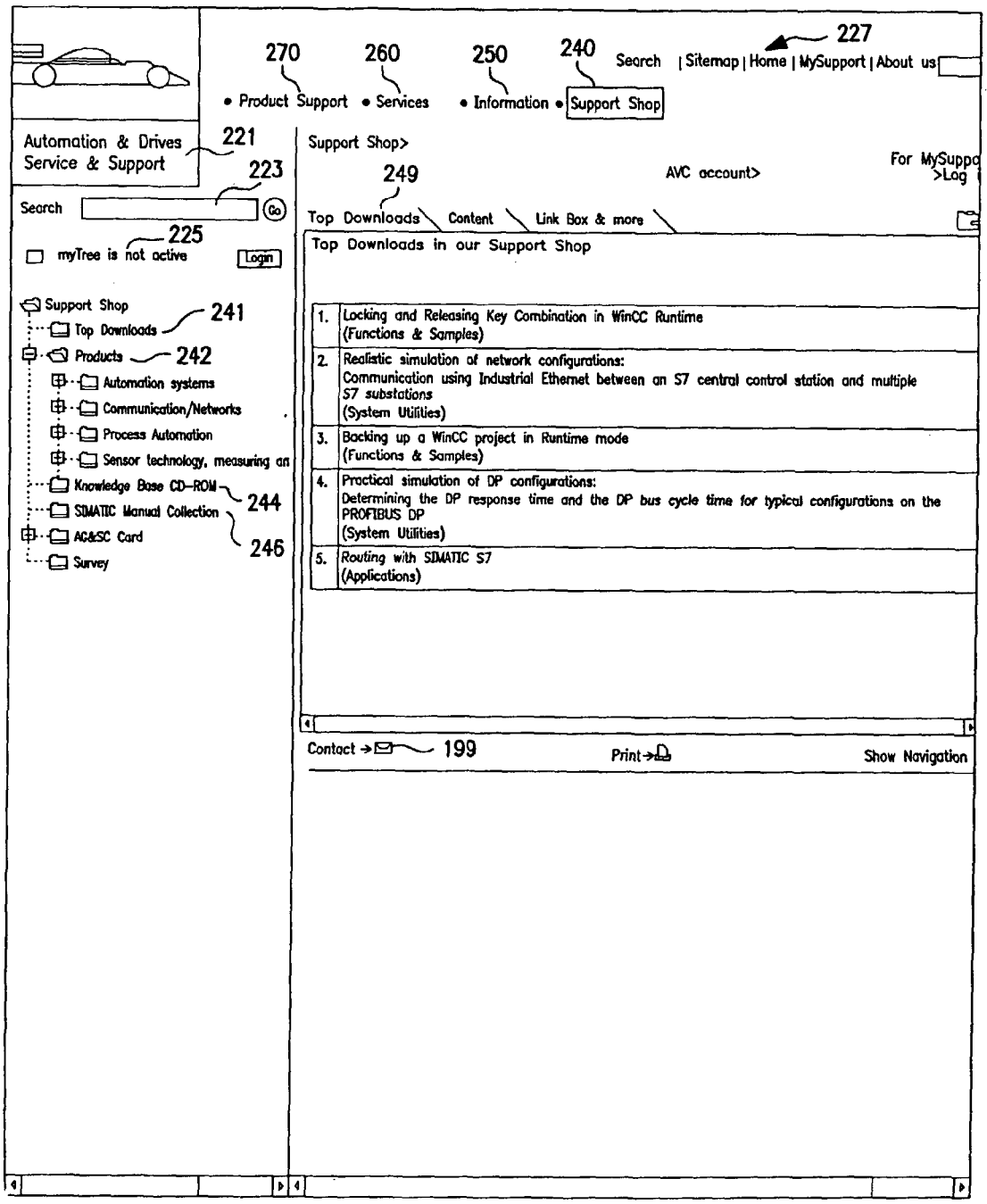
FIG. 6C shows an embodiment of a user interface screen supporting a selection of preselected downloads that can be purchased using the AG&SC card, according to an aspect of the present invention.

FIG. 6B shows support shop web page under contents tab 243. The support shop sidebar, when selected, retrieves a contents page, where, among other things, automation related items 248 are listed. FIG. 6C shows a list 242 of products with corresponding drop-down menus open, such as automation systems, communication networks, process automation and sensor technology. A drop-down menu for the AG&SC car is also given. A list of top downloads 249 in the support shop is shown in the main body of the web page.

Figure 7A:
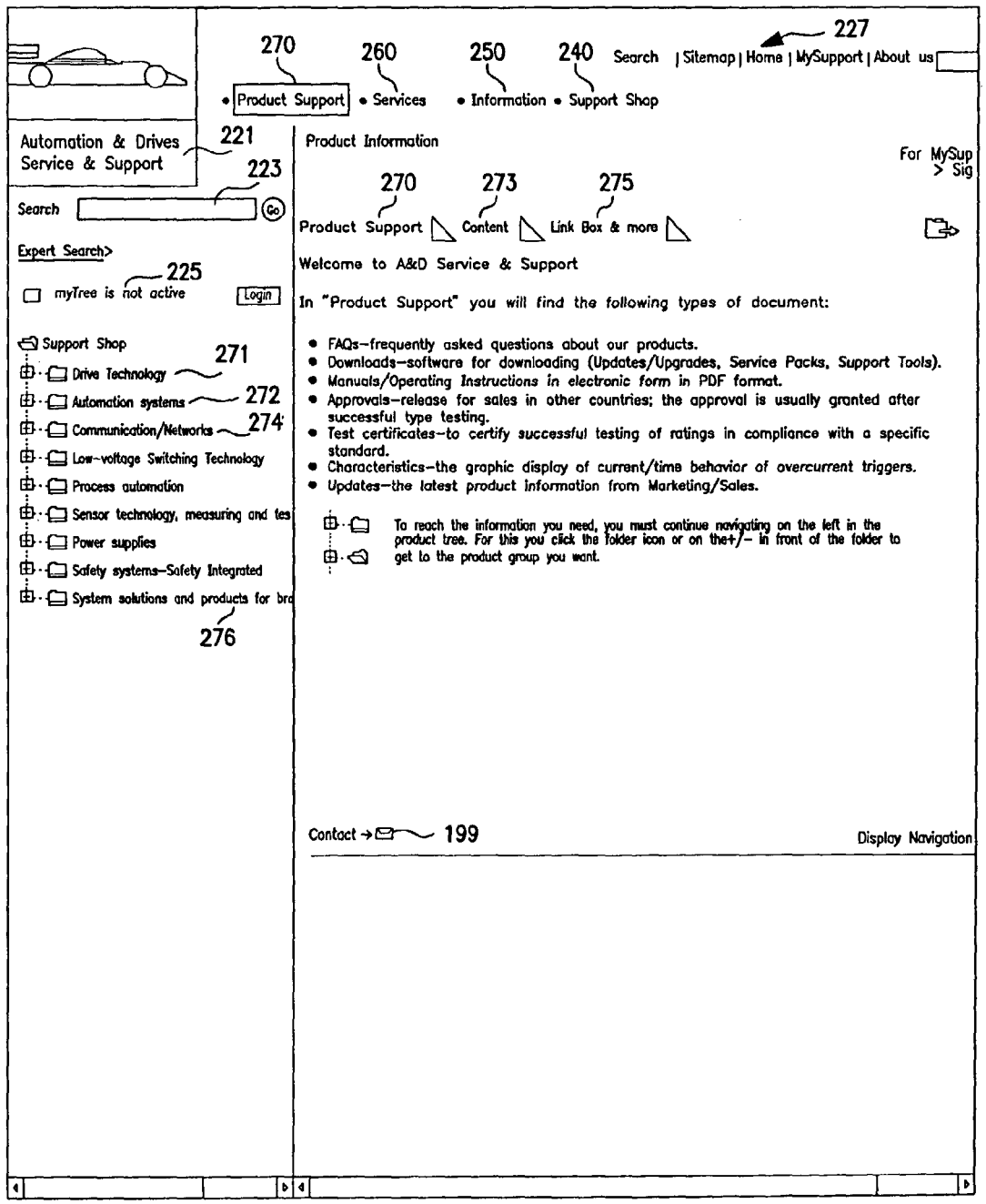
FIG. 7A shows an embodiment of a user interface screen supporting a selection of product support services that can be purchased using an AG&SC card, according to the present invention.
Figure 7B:
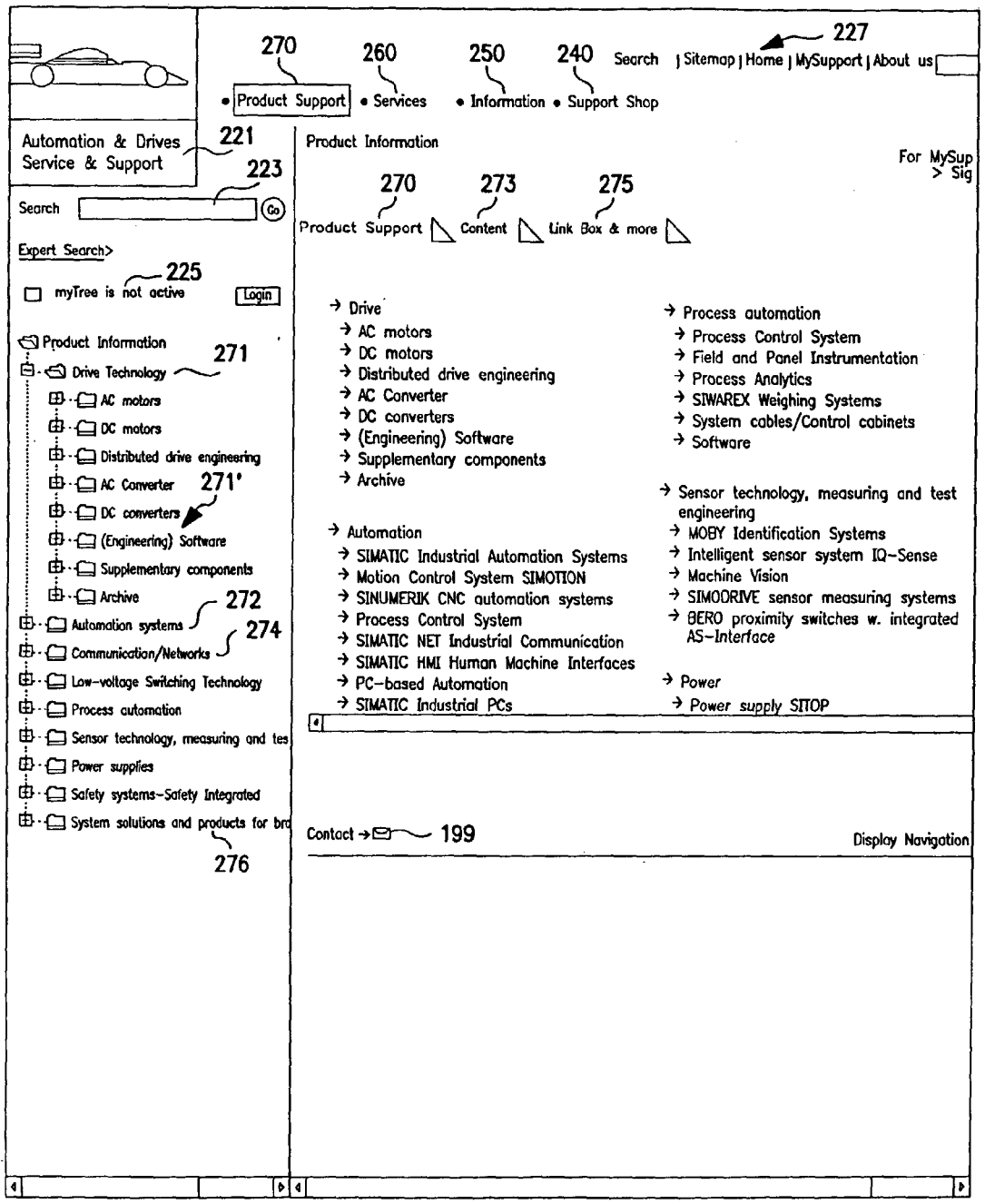
FIG. 7B shows an embodiment of a user interface screen supporting a selection of contents of product information, according to the present invention.
Figure 7C:
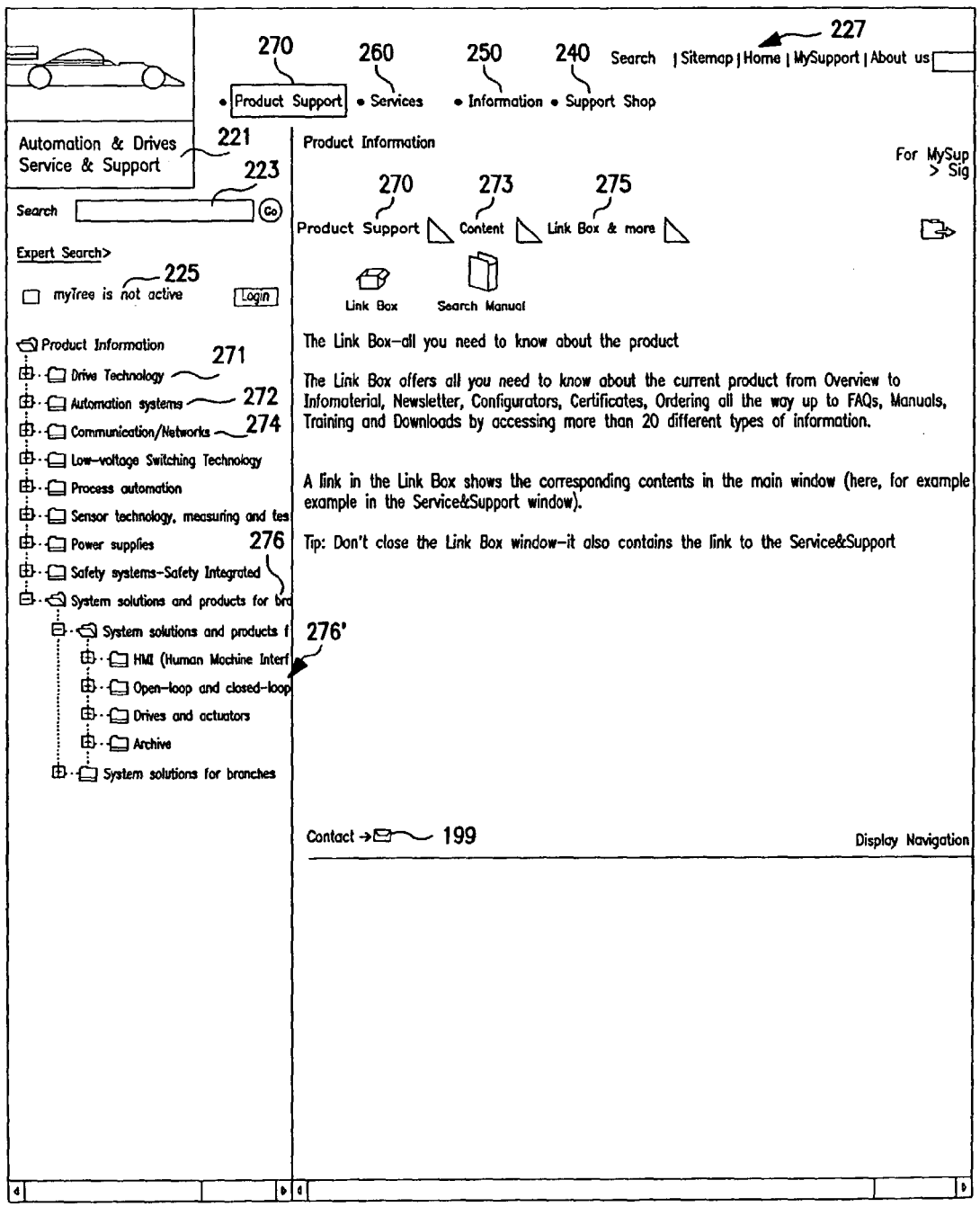
FIG. 7C shows an embodiment of a user interface screen supporting a link box for accessing product information links, according to the present invention.

Product support link 270 of the web page shown in FIG. 5A yields the web page shown in FIG. 7A. On the sidebar, product information involving, among others, drive technology 271, automation systems 272, communication/networks 274, low-voltage switching technology, and system solutions and products 276 are given. Tabs 273 and 275 link to the contents and link box, respectively, related to the product support. In the contents web page shown in FIG. 7B, the items listed in drop-down menu for drive technology 271, as well as others, are shown in the main body of the web page. FIG. 7C shows the system solutions and products drop-down menu 276' on the sidebar, while the main text area on the web page presents information related to link box and more 275.

Figure 8B:
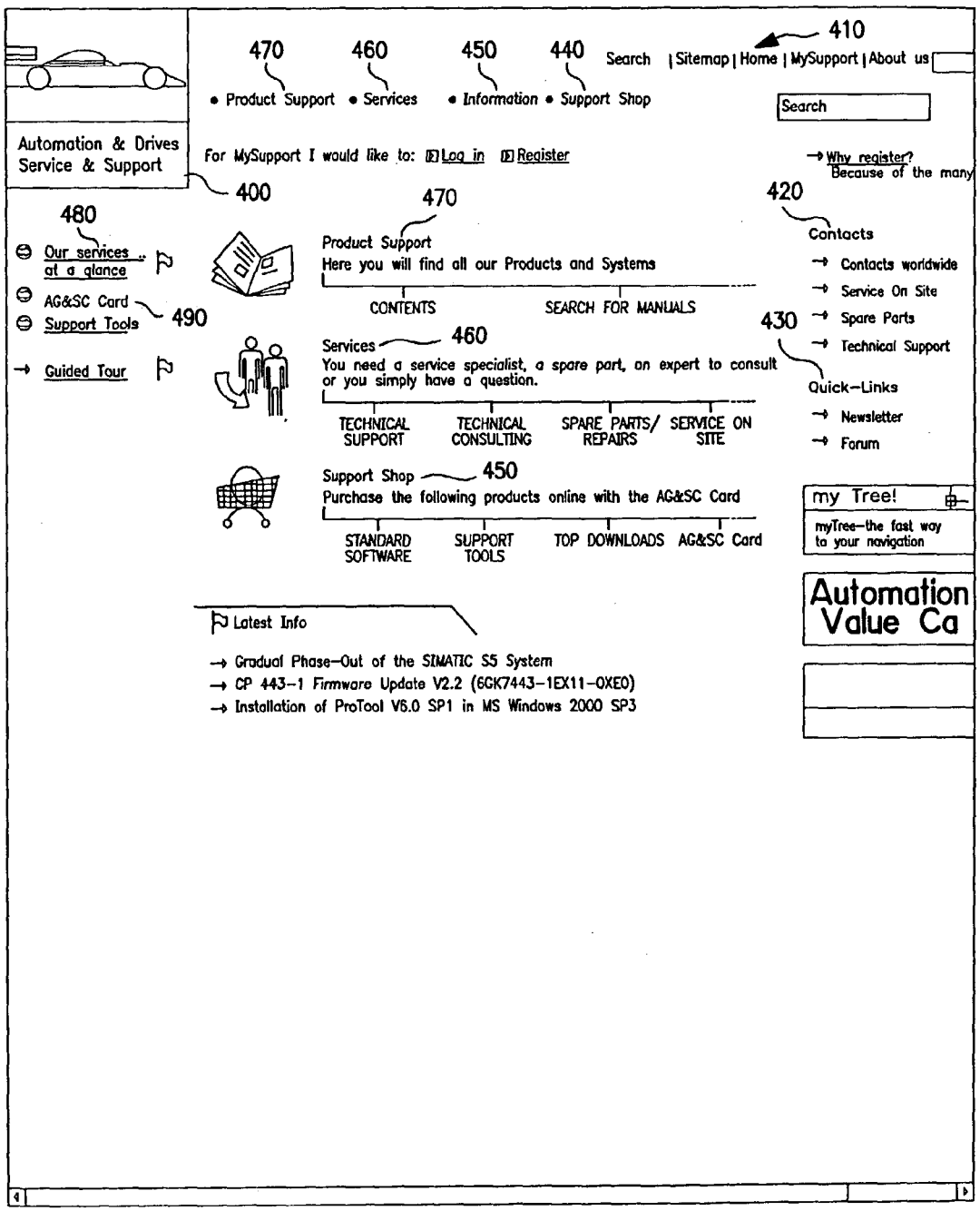
FIG. 8B shows an embodiment of a user interface screen supporting an overall view of the goods and services that are available for purchase with the AG&SC card of the present invention.

Other links 170, 180 and 300 shown in the AG&SC Card Customer Area web page of FIG. 4C connect to e-commerce, news center, and products and solutions, respectively. Link 300 brings up the products and solutions web page 300 that serves the Automation Goods and Services business (AG&SB) unit 400. The web page shown in FIG. 8A lists the various products and solutions that are available. Clicking 330 can access the web site for the AG&SB unit. FIG. 8B shows AG&SB unit web site 400, where links 410 useful to a customer, contacts 420 and quick-access links 430 can be accessed readily. Support shop 440, information 450, services 460 and product support 470 can also be accessed in a manner similar to those described above. A side bar provides a summary of services 480, and access to Automation Goods and Services Charge (AG&SC) card 490 for purchasing these various goods and services. Support tools are also accessible from the sidebar in FIG. 8B.

An AG&SC card can be used worldwide from any telephone, fax, Internet or other network connection, without the need for any additional devices. The customer enters the card number and PIN to gain access to the automation goods and services offered by the business units of the enterprise, as well as the service and support services offered by the enterprise using the system as described. The value, in credits, of the goods and/or services purchased by the account holder is debited from the account associated with the AG&SC card.

All the services (and goods) offered on the system are marked currency-neutral so that the AG&SC card can be used worldwide. When an account holder in, say, Latin America, wishes to make a purchase from the automation goods and services company located in, say, Europe, the prices of particular goods and services in credits may be tied to the value of a particular base currency of convenience, e.g., the Euro. In this manner, as currency exchange rates fluctuate, there is no need to constantly update the exchange rate between credits associated with a particular offering, and the currency used by a particular customer. Rather, knowing the exchange rate between ones' home currency, e.g., the Mexican peso, and the Euro, one can also quickly compute the cost of products in credits as a function of that home currency.

In one aspect of the present invention, leftover credits in different card accounts can be transferred to a single such account as shown in FIG. 4E. Conversely, it is also possible to split the credits in one card account and distribute them across several different card accounts. In another embodiment, when the credits on the card are all exhausted, the customer can readily reload the card online with credits from one or more card accounts that still hold credits.

Figure 9:
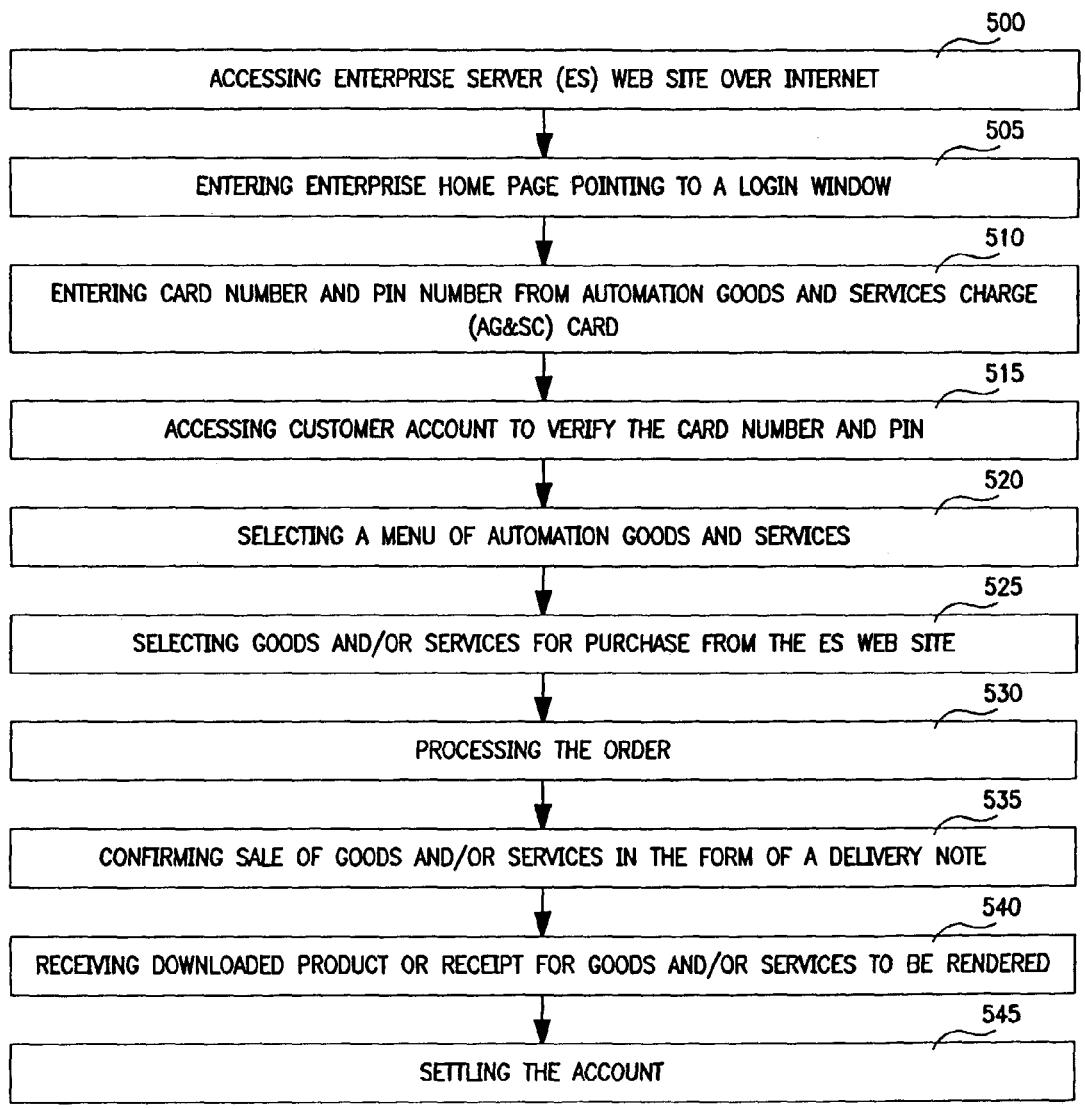
FIG. 9 is a flowchart showing the steps involved in purchasing automation goods and services from an automation goods and services enterprise using an automation goods and services charge card, according to the present invention.

The flow chart of FIG. 9 shows steps associated with purchasing automation goods and services over the Internet using an AG&SC card 110, such as shown in FIG. 4A, having a card number and a PIN. In addition, an account associated with the card is loaded with a value with which to make purchases. The value is derived from the customer by any known means, including credit card, or invoicing. In an embodiment of the present invention, the value of the card is expressed in units of credits. Each unit of credit is currency-neutral, so that AG&SC card 110 can be used worldwide. The amount of the goods and services purchased are deducted from the credits in the account associated with the card. As described more generally above, an embodiment of the enterprise system in an embodiment of the present invention pegs the value of the credits to an actual currency, e.g., the U.S. dollar or the Euro, eliminating any need for the system to handle currency conversions after a purchase is made. Rather, the system takes into account exchange rates when credits are being purchased by a buyer whose currency may fluctuate with respect to the base currency associated with the credits (e.g., U.S. dollar, Euro, etc.).

In the embodiment of the present invention shown in FIG. 9, a customer accesses at 500 the enterprise host server 15 shown in FIG. 2, by entering the appropriate universal resource locator, URL, as the address of the web site for the business enterprise. Host server 15 displays a home page with a window to log on at 505. The customer enters a card number and a personal identification number as provided on the AG&SC card at 510. The host server checks the information entered with the registration and account number databases provided in the system management and administration files 90 shown in FIG. 3. Once the information is verified at 515, the server displays a menu for automation goods and services at 520. The customer makes a selection of items from the menu and submits an order accordingly at 525. The system checks the availability of the selected items. If available, the system subtracts the credit value of the items from the credit value available on the card and processes the order 530. If the amount of credit in the account associated with the card is insufficient, credits from other cards can be transferred online as described above.

The system server then confirms the sale of automation goods and/or services in the form of a delivery note at 535. Accordingly, the customer receives the downloadable services or a receipt for goods to be rendered at 540. The transaction is consummated, the account settled paperlessly and absent any invoicing.

Figure 10:
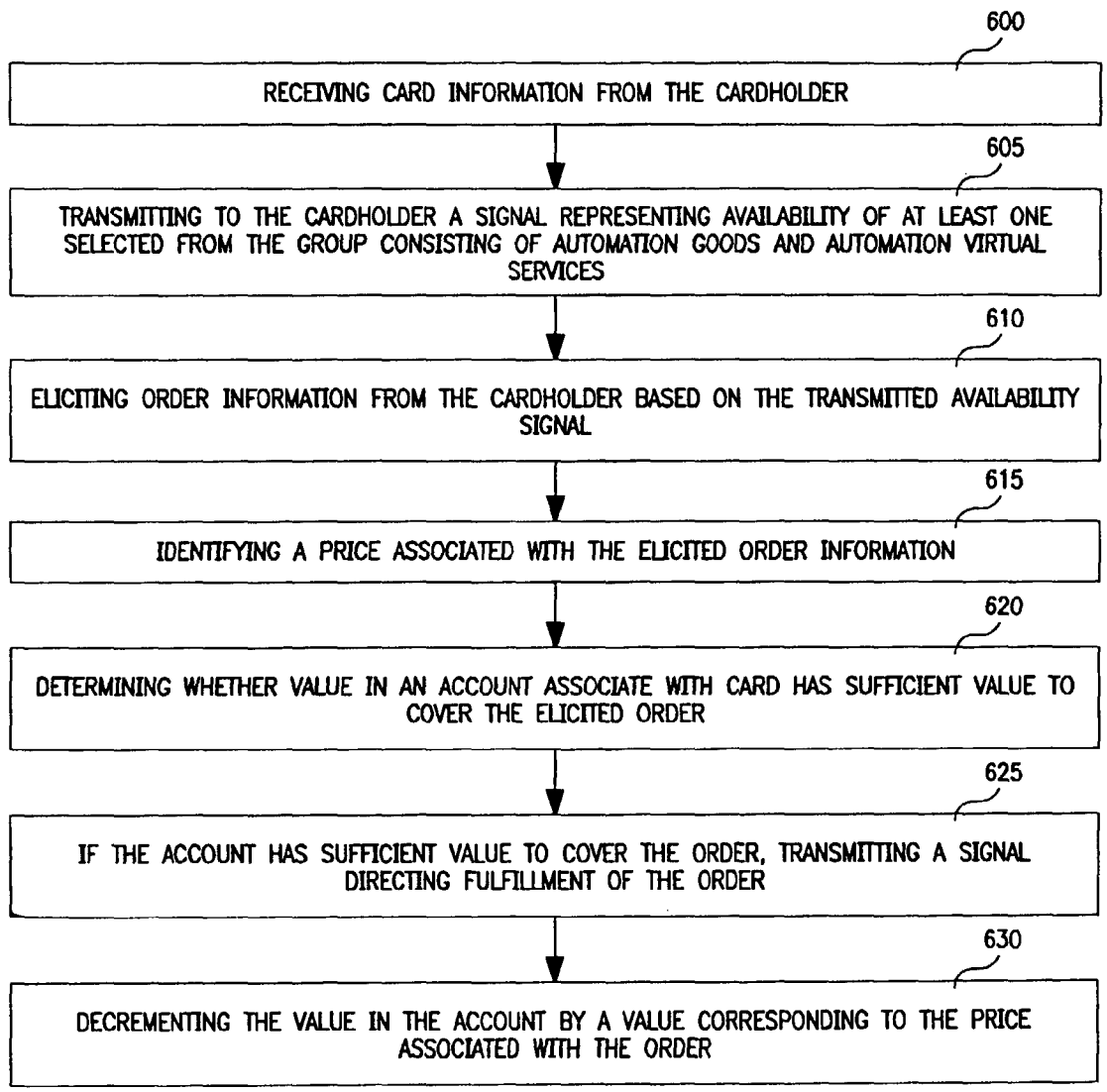
FIG. 10 is a flowchart showing a method for administering an automation goods and services charge card account, where the method permits a card-holding customer of an automation goods and services enterprise to purchase goods and services from any one of a plurality of business units of the enterprise, according to the present invention.

In another embodiment of the present invention, FIG. 10 shows the interaction of the host server with an account holder. The host receives card information from the AG&SC account holder at 600. The server transmits to the account holder a signal representing availability of automation goods or automation virtual services or both 605. Based on the availability signal, the server elicits order information from the account holder 610. The server identifies a price associated with the elicited order information 615 and determines whether value in an account associated with the card has sufficient value to cover the elicited order 620. If the account has sufficient value to cover the order, the server transmits a signal-directing fulfillment of the order 625. Accordingly, the value in the account is decremented by a value corresponding to the price associated with order. The transaction is consummated paperlessly and without invoicing.

In another embodiment of the present invention, a method of doing business transactions directly with business units of an automation goods and services enterprise is accomplished by permitting a card holding customer to purchase virtual automation goods and services from any one plurality of business units of the enterprise. Within the enterprise system, an automation goods and services charge card computer communicates with the account holder and, over a network, with a plurality of business units. The computer transmits automation goods and services information to the account holder and receives order information from the account holder regarding a purchase from at least one of the plurality of business units. The automation goods and services computer maintains the account holder account and also maintains accounts corresponding each of the plurality of business units. The automation goods and service computer debits the account holder account to reflect account holder order information and settles the account of any of the plurality of business units affected by the account holder order.

Figure 11:
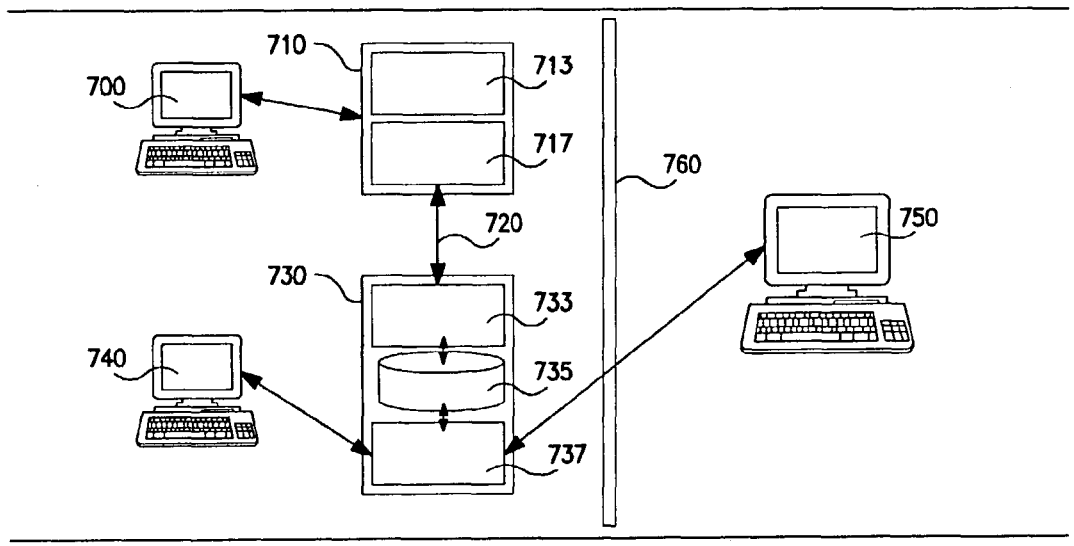
FIG. 11 is a schematic drawing showing a system for providing automation-related offerings, from an automation goods and services provider having a plurality of business units, that can be purchased using online shopping or using an AG&SC card, according to an aspect of the present invention.

In yet another embodiment of the present invention, a system provides capability for purchasing goods and services with or without an AG&SC card. Referring to FIG. 11, a non-account holder 700 can shop online via online server 710, which in turn communicates with AG&SC card server 730 that communicates with the former server using, e.g., file transfer protocol 720. Online server 710 includes port 713 and script file 717. AG&SC card server 730 includes information management databank 733, SQL database 735, and script file 717. A dispatching system 750 communicates with the AG&SC card server 730 such that the online shopper can be served through the AG&SC card server 730 as shown in FIG. 11. Furthermore, a holder of an AG&SC card can automatically purchase goods and services either online or through any other device, such as a telephone or fax that can communicate with the AG&SC card server.

While the invention has been particularly shown and described with reference to particular embodiments, those skilled in the art will understand that various changes in form and details may be made (e.g., system functionality implemented by various hardware and software arrangements or method steps varied) without departing form the spirit and scope of the invention as set forth in the appended claims. An automation goods and services company or enterprise with a plurality of business units may, for purposes of this invention, include an arrangement where the business units are not necessarily owned by, but are business affiliates of, the automation goods and services company.

What is claimed is:

1. A method for an automation goods and services provider having a plurality of business units and a host server to process purchase requests of an automation goods and services charge card account holder, the requests relating to offerings of at least one of any of the plurality of business units, the method comprising the steps of:
   transmitting, by the host server, a signal representing availability of an offering of at least one of the plurality of business units, the offering selected from the group consisting of automation goods and automation virtual services, the offering to be provided by the at least one business unit;
   receiving, by the host server, account information from the account holder;
   eliciting, by the host server, order information based on the transmitted availability signal;
   checking, by the host server, whether value in the account is sufficient to cover the purchase request;
   transmitting, by the host server, a signal directing fulfillment of the order; and
   decrementing, by the host server, the account balance by the value of the order,
   wherein the method steps for processing purchase requests of the automation goods and services charge card account holder are performed by the host server, and
   wherein the value in the account represents currency-neutral credits purchased by the account holder using actual currency, the currency-neutral credits being converted from actual currency at the time of purchase.

2. The method according to claim 1, wherein the account information comprises an account number.

3. The method according to claim 1, wherein the account information comprises account holder identification number.

4. The method according to claim 1, wherein the account information comprises value associated with the account.

5. The method according to claim 1, wherein the availability signal is transmitted over a communications network.

6. The method according to claim 1, wherein the information from the account holder is received via a communication device.

7. The method according to claim 6, wherein the communication device comprises a computer terminal.

8. The method according to claim 6, wherein the communication device comprises a telephone or a fax machine.

9. The method according to claim 6, wherein the communication device comprises a wireless communication terminal.

10. The method according to claim 1, wherein the account holder holds a card associated with the account.

11. The method according to claim 1, wherein the account information comprises a card number.

12. A method for an automation goods and services provider having a plurality of business units and a host server to process purchase requests of an account holder, the requests relating to offerings of at least one of any of the plurality of business units, the method comprising the steps of:
   transmitting, by the host server, a signal representing availability of at least one offering selected from the group consisting of automation goods and automation virtual services, the offering to be provided by the at least one business unit;
   receiving, by the host server, account information from the account holder;
   eliciting, by the host server, order information based on the transmitted availability signal;
   checking, by the host server, whether value in the account is sufficient to cover the purchase request;
   transmitting, by the host server, a signal directing fulfillment of the order; and
   decrementing, by the host server, the account balance by the value of the order,
   wherein the method steps for processing purchase requests of the account holder are performed by the host server, and
   wherein the value in the account represents currency-neutral credits purchased by the account holder using actual currency, the currency-neutral credits being converted from actual currency at the time of purchase.

13. The method according to claim 12, wherein the account information comprises an account number.

14. A system for administering an automation goods and services charge card account, the system permitting a card-holding customer of an automation goods and services enterprise associated with the account to purchase goods and services from any of a plurality of business units of the enterprise, the system comprising:
   an automation goods and services enterprise computer in communication with the customer and, over a network, with a plurality of business units of the enterprise;
   wherein the automation goods and services enterprise computer transmits automation goods and services information to the customer and receives order information from the customer regarding at least one purchase from at least one of the plurality of business units, receives account information from the customer, and elicits order information based on the transmitted information;
   maintains the customer's charge card account and maintains accounts corresponding to each of the plurality of business units and debits the customer's charge card account to reflect card holder order information and to settle the account of any of the plurality of business units affected by the customer's purchase, and wherein the value in the customer's charge card account represents currency-neutral credits purchased by the card-holding customer using actual currency, the currency-neutral credits being converted from actual currency at the time of purchase.

15. The system for administering an automation goods and services charge card account according to claim 14, wherein the goods comprise automation hardware.

16. The system for administering an automation goods and services charge card account according to claim 14, wherein the at least one purchase comprises at least two purchases, at least one each from differing ones of the plurality of business units.

17. The system for administering an automation goods and services charge card account according to claim 14, wherein the services comprise downloadable software.

18. The system for administering an automation goods and services charge card account according to claim 14, wherein the customer's account is associated with the card.

19. The system for administering an automation goods and services charge card account according to claim 14, wherein the order information comprises data representing at least one offering selected from the group consisting of automation goods and automation virtual services, the offering to be provided by the at least one business unit.

20. The system for administering an automation goods and services charge card account according to claim 14, wherein the automation goods and services information transmitted by the automation goods and services enterprise computer to the customer comprises data representing availability of at least two offerings selected from the group consisting of automation goods and automation virtual services, the offerings to be provided by differing respective ones of the plurality of business units.

21. The system for administering an automation goods and services charge card account according to claim 14, wherein the order information from the card holder is received via a communication device.

22. The system for administering an automation goods and services charge card account according to claim 21, wherein the communication device comprises a personal computer.

23. The system for administering an automation goods and services charge card account according to claim 19, wherein the customer account of any of the plurality of business units is decremented by a value associated with the order received from the customer.

24. The system for administering an automation goods and services charge card account according to claim 23, wherein the value comprises currency-neutral value units.

25. An enterprise system architecture for administering use of an automation goods and services charge card, provided by an automation goods and services provider having a plurality of business units, automation goods and automation services offered to the cardholder by at least one of the business units, the system architecture comprising:

means for the card holder to access information relating to offerings of any one of the plurality of business units;
means for managing the card holder's account, the account serviced by at least one of the plurality of business units;
means for receiving account information from the card holder;
means for eliciting order information based on the access information; and
means for transmitting an order for purchasing automation goods and services offered by any one of the business units of the plurality of business units, wherein the enterprise system architecture is implemented on an enterprise server system, and, wherein the value in the account represents currency-neutral credits purchased by the account holder using actual currency, the currency-neutral credits being converted from actual currency at the time of purchase.

26. The enterprise system architecture according to claim 25, wherein the means for managing the holder's account further comprises an enterprise data structure capable of representing orders from more than one of the plurality of business units.

27. The enterprise system architecture according to claim 26, wherein the enterprise data structure is configured to respond to world-wide orders in currency-neutral units.

28. The enterprise system architecture according to claim 25, wherein the card holder holding an account with at least one of the plurality of business units, the system architecture further comprising means for settling the account of the card holder.

29. The enterprise system architecture according to claim 25, wherein the system architecture further comprises means for updating the card holder's account information registered at any one of the plurality of business units.

30. The enterprise system architecture according to claim 25, wherein the system architecture further comprises means for archiving permanent data associated with the card holder's account serviced by any of the plurality of business units.

31. The enterprise system architecture according to claim 25, wherein the system architecture further comprises means for providing non-card holders to purchase automation and goods services from any of the group consisting of the enterprise system and the plurality of business units associated with the enterprise system.

32. A system for providing automation-related offerings of an automation goods and services enterprise system having a plurality of business units, the offerings comprising at least one selected from the group consisting of automation goods and automation virtual services, comprising:

an automation goods and services charge card server in communication with a plurality of business units and for supporting transactions between the business units and a holder of such card;
a dispatching system in communication with the automation goods and services card server of at least one of the plurality of business units; and
an online enterprise server in communication with the automation goods and services charge card server of at least one of the plurality of business units, for supporting transactions with customers interacting with the automation goods and services charge card server as a card holder, wherein the transactions are conducted in currency-neutral credits purchased by the card holder using actual currency, the currency-neutral credits being converted from actual currency at the time of purchase, and wherein the online enterprise server receives account information from the card holder and elicits order information based on transmitted content.

33. The system for providing automation-related offerings according to claim 32, the system further comprising an online enterprise server in communication with the automation goods and services charge card server for supporting transactions with customers including noncard holders.

34. The system for providing automation-related offerings according to claim 32, wherein the communication with the card server comprises a signal representing at least one offering selected from the group consisting of automation goods and automation virtual services.

35. The system for providing automation-related offerings according to claim 32, wherein the transaction from the card holder is received at the at least one of a plurality of business units via a communication device.

36. The system for providing automation-related offerings according to claim 32, wherein the card holder holds an account associated with the card.

37. The system for providing automation-related offerings according to claim 33, wherein the transaction from the non-card holder is received from an online shop.

38. The system for providing automation-related offerings according to claim 32, wherein an account associated with the card holder is decremented by a value of the transaction conducted by the card holder.

39. The system for providing automation-related offerings according to claim 38, wherein the value comprises currency-neutral value units.

40. The system for providing automation-related offerings according to claim 32, wherein the dispatcher is separated from the online enterprise server and the automation goods and services charge card server by a security firewall.

41. A method for an automation goods and services provider, having a plurality of business units and a host server, to transmit signals to a customer, the signals relating to automation goods and services available from the plurality of business units, and to process a purchase order from the customer, the method comprising the steps of:
    transmitting, by the host server, to a customer a signal representing availability of at least one offering selected from the group consisting of automation goods and automation virtual services, the offering to be provided by at least one of the plurality of business units;
    receiving, by the host server, account information from the customer;
    eliciting, by the host server, order information from the customer based on the transmitted availability signal;
    checking, by the host server, whether the customer is an account holder with the at least one business unit;
    if the customer is an account holder, checking whether value in the customer's account is sufficient to cover the purchase order;
    if value in the customer's account is sufficient, transmitting a signal directing fulfillment of the order for the customer; and
    settling, by the host server, the customer's account to reflect the order,
    wherein the method steps for transmitting signals to the customer and for processing the purchase order from the customer are performed by the host server, and
    wherein the value in the account represents currency-neutral credits purchased by the account holder using actual currency, the currency-neutral credits being converted from actual currency at the time of purchase.

42. The method according to claim 41 further comprising the steps of:
    presenting, if the customer is a non-card holder, available choices for payment in different denominations through at least one of a plurality of different financial entities; and
    settling the customer's account to reflect the order.

43. The method according to claim 41, wherein communications with the customer are conducted over the internet using web technology.

44. The method according to claim 41, wherein the account holder holds an automation goods and services charge (AG&SC) card.

45. The method according to claim 44, wherein the AG&SC card provides a card number and a PIN.

46. The method according to claim 41, wherein the value is denominated in a form comprising currency-neutral value units.

47. The method according to claim 41, wherein the fulfillment of the order for the card holder includes decrementing the account balance by the value of the order.

48. A system providing automation-related offerings of an automation goods and services provider, the provider having a plurality of business units, the system comprising:
    an automation goods and services card computer in communication with computers associated with a plurality of business units of the provider;
    wherein the automation goods and services card computer transmits online shop content to the card holder, the online shop providing the card holder with access to information relating to offerings of the plurality of business units, receives account information from the card holder; and elicits order information based on the transmitted content; and
    wherein the automation goods and services card computer to transmits content related to support services for the card holder.

49. The system according to claim 48, wherein the content further comprises support services related to transfer of credits between accounts.

50. The system according to claim 48, wherein the content further comprises support services related to distribution of credits between accounts.

51. The system according to claim 48, wherein the information further comprises services related to customer care.

* * * * *